United States Patent [19]

Hidaka

[11] Patent Number: 5,636,334
[45] Date of Patent: Jun. 3, 1997

[54] THREE-DIMENSIONAL IMAGE CREATION DEVICES

[75] Inventor: Norihiro Hidaka, Ome, Japan

[73] Assignee: Casio Computer Co., Ltd., Tokyo, Japan

[21] Appl. No.: 376,869

[22] Filed: Jan. 23, 1995

[30] Foreign Application Priority Data

| Jan. 28, 1994 | [JP] | Japan | 6-024889 |
| May 31, 1994 | [JP] | Japan | 6-139661 |
| May 31, 1994 | [JP] | Japan | 6-139718 |

[51] Int. Cl.$^6$ ................................................. G06T 11/60
[52] U.S. Cl. ............................. 395/119; 395/135; 359/462
[58] Field of Search ............................. 395/119, 135, 395/122, 121; 347/199; 359/462

[56] References Cited

U.S. PATENT DOCUMENTS

| 4,135,502 | 1/1979 | Peck | 128/76.5 |
| 5,157,413 | 10/1992 | Nagato et al. | 347/199 |
| 5,289,568 | 2/1994 | Hosoya et al. | 395/135 |
| 5,371,627 | 12/1994 | Baccei et al. | 359/462 |

OTHER PUBLICATIONS

Tyler et al., "The Autostereogram", SPIE vol. 1256 Stereoscopic Displays ans Applications, pp. 182–197. Feb. 14, 1990.
Slinker et al., "The Generation and Animation of Random Dot and Random Line Autostereograms", Journal of Imaging Science and Technology, vol. 36, No. 3.
Journal of Computers in Mathematics and Science Teaching, vol. 6, No. 2, Jan., 1986, pp. 15–22, Boyer, "Constructing True Stereograms on the Machintosh".
IEEE Transactions on Systems, Man and Cybernetics, vol. 21, No. 101, Jan., 1991, New York, USA, pp. 228–231, XP 000202635, Obaidat and Leguire, "A Dynamic and Static Microcomputer–Based Stereogram Generator".

*Primary Examiner*—Mark K. Zimmerman
*Attorney, Agent, or Firm*—Frishauf, Holtz, Goodman, Langer & Chick

[57] ABSTRACT

A CPU sequentially reads bit data on a figure stored in a character-to-be-converted area. When the last read bit data is "0" and the current read bit data is "1", the CPU saves into a character saving area that character data of character string data stored in a character processing area and pointed out by a pointer, then arranges the character data pointed out by the pointer in a corresponding position in a three-dimensional image creation area, and updates the pointer. When the last read bit data is "1" and the current read bit data is "0", the CPU inserts the character data saved in the character saving area at a position pointed out by the pointer in the character processing area, arranges the character data at a corresponding position in the three-dimensional image creation area, and updates the pointer. When the last read bit data is equal to the current read bit data, the CPU arranges the character data pointed out by the pointer in the character processing area in the three-dimensional image creation area, and updates the pointer. In this way, the CPU arranges the character string data stored in the character processing area in the three-dimensional image creating area to create three-dimensional data on the figure stored in the character-to-be-converted area and to be converted and prints the created three-dimensional data on recording paper with a printer.

5 Claims, 30 Drawing Sheets

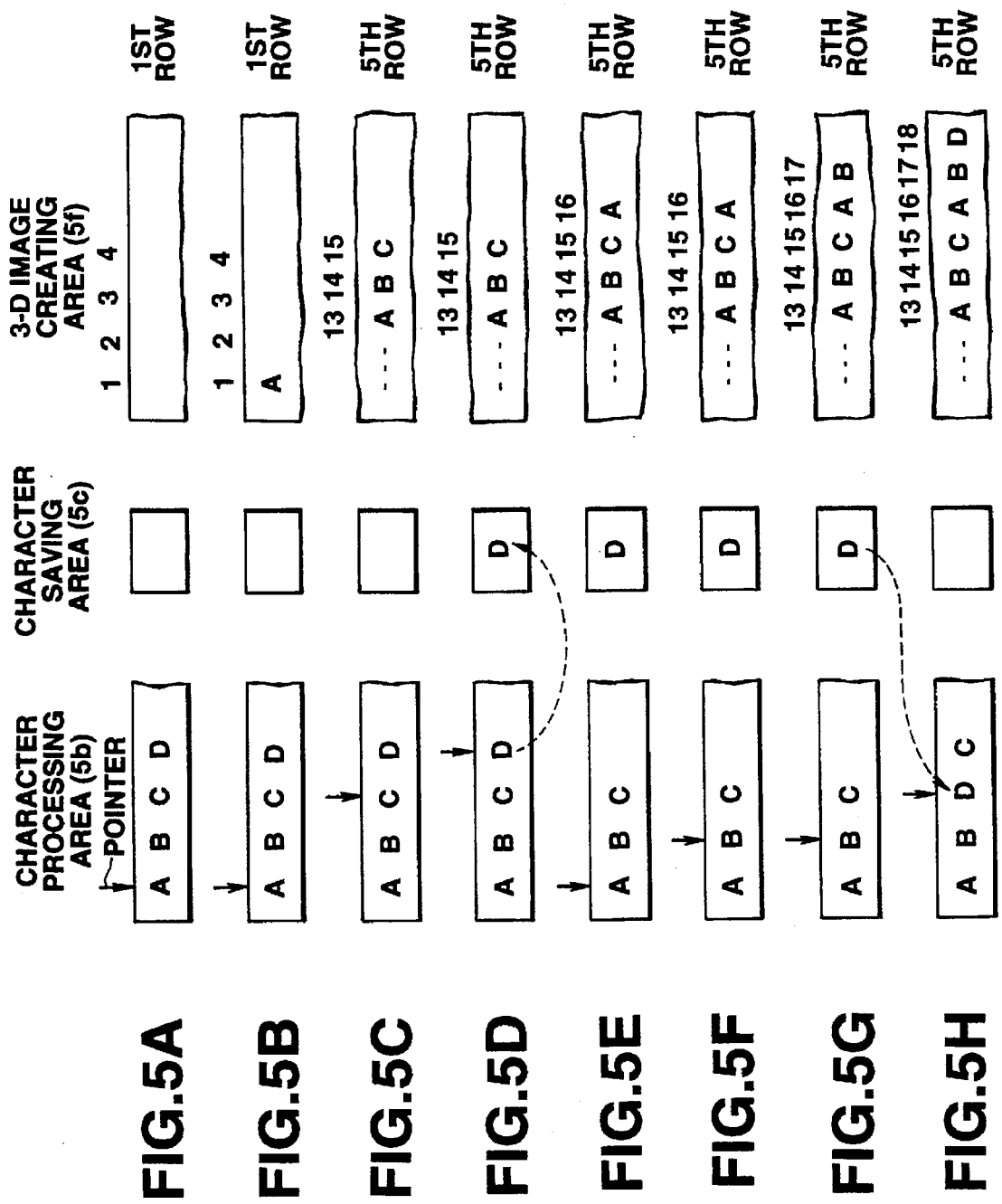

FIG.6

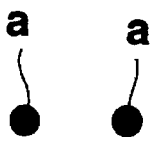

```
A B C D A B C D A B C D A B C D A B C D A B C D A B C D
A B C D A B C D A B C D A B C D A B C D A B C D A B C D
A B C D A B C D A B C D A B C D A B C D A B C D A B C D
A B C D A B C D A B C D A B C D A B C D A B C D A B C D
A B C D A B C D A B C D A B C A B D C A B D C A B D C A
A B C D A B C D A B C D A B D A B D C A B D C A B D C A
A B C D A B C D A B C D A C D A C D A B C D A B C D A B
A B C D A B C D A B C D A C D B A D B C A D B C A D B C
A B C D A B C D A B C D B C D A B D A B C D A B C D A B
A B C D A B C D A B C D B C A D B C D B A C D B A C D B
A B C D A B C D A B C A B C D A B C A B C D A B C D A B
A B C D A B C D A B C A B D C A B D C B D A C B D A C B
A B C D A B C D A B D A B D A B D A B C D A B C D A B C D
A B C D A B C D A B D A B D A B D A B C D A B C D A B C D
A B C D A B C D A C D A B C D A B C D A C D A B C D A B
A B C D A B C D B C D B C A D B C A D C A D C A B D C A B D C A
A B C D A B C D B C D B C A D B C A D C A D C A B D C A B D C A
A B C D A B C D A B C D A B C D A B C D A B C D A B C D
A B C D A B C D A B C D A B C D A B C D A B C D A B C D
A B C D A B C D A B C D A B C D A B C D A B C D A B C D
A B C D A B C D A B C D A B C D A B C D A B C D A B C D
```

BASIC PART PATTERN ROM

| PART NO. | PART \ PATTERN NO. | NO.1 | NO.2 | | NO.20 |
|---|---|---|---|---|---|
| 01 | (FACE) CONTOUR | ∪ | ∪ | | △ |
| 02 | HAIR STYLE | ▬ | ▬ | | \|\|\|/ |
| 03 | EYES | ◠ ◠ | ≍ | | ▽ ▽ |
| 04 | NOSE | c | ∧ | | △ |
| 05 | MOUTH | ∪ | ∧ | | △ |

MONTAGE RAM

| PART | PATTERN NO. |
|---|---|
| (FACE) CONTOUR | NO.1 |
| HAIR STYLE | NO.8 |
| EYES | NO.14 |
| NOSE | NO.1 |
| MOUTH | NO.1 |

MG

ORDINARY EYES

EYES VIEWING A STEREOGRAM
THREE-DIMENSIONALLY

| PATTERN | DEG. OF 3-D | PATTERN | DEG. OF 3-D |
|---------|-------------|---------|-------------|
| C | 1 | ∧ | 1 |
| C | 2 | ∧ | 2 |
| ⋮ | ⋮ | ⋮ | ⋮ |
| C | 5 | ∧ | 3 |

FIG.27

INDIVIDUAL DATA RAM

| | INDIVIDUAL DATA | MONTAGE DATA | SECRET FLAG F |
|---|---|---|---|
| 1 | NAME : NOBUO KANAMARU<br>ADDRESS : ○○HINO, TOKYO<br>TEL. : 0425 (00) ○○○○<br>OTHERS : BORN JAN. 1, 1969 | (FACE)<br>CONTOUR : 1  NOSE : 1<br>HAIR : 2  MOUTH : 1<br>EYES : 2 | 1 |
| 2 | NAME : ○○○○<br>ADDRESS : ○○○○○○<br>TEL. : ○○○○○<br>OTHERS : ○○○○○ | (FACE)<br>CONTOUR : 2  NOSE : 7<br>HAIR : 5  MOUTH : 11<br>EYES : 20 | 0 |
|  | NAME : ○○○○<br>ADDRESS : ○○○○○○<br>TEL. : ○○○○○<br>OTHERS : ○○○○○ | (FACE)<br>CONTOUR : 7  NOSE : 7<br>HAIR : 10  MOUTH : 8<br>EYES : 7 | 0 |
| 50 | NAME : NAOKI MURATA<br>ADDRESS : ○○ OUME, TOKYO<br>TEL. : 0428 (32)○○○○<br>OTHERS : BORN JUNE 6, 1990 | (FACE)<br>CONTOUR : 12  NOSE : 15<br>HAIR : 12  MOUTH : 9<br>EYES : 11 | 1 |

FIG.31
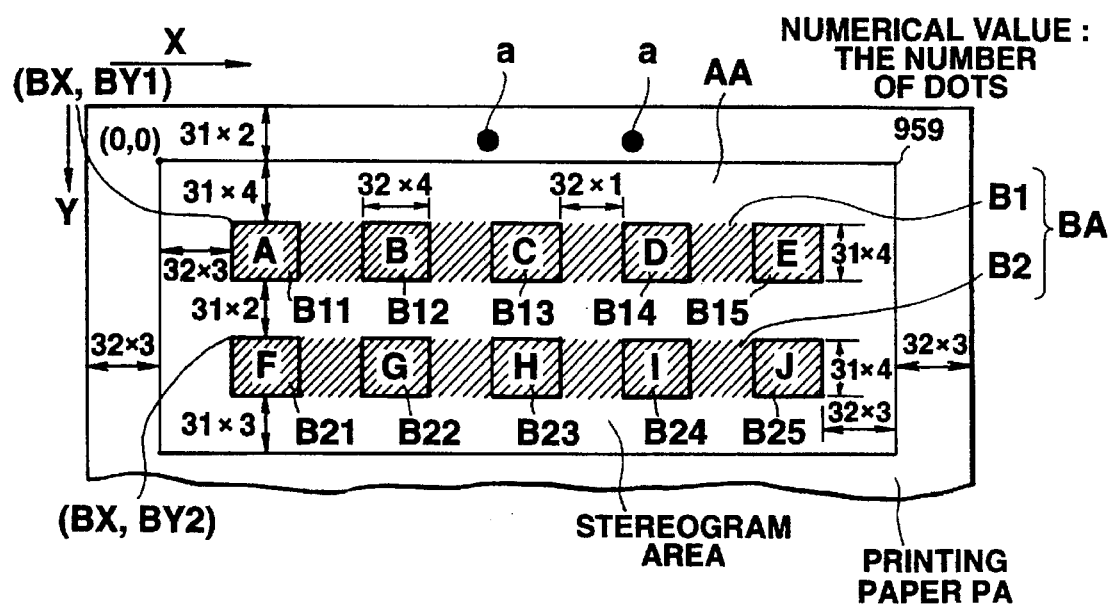
FIG.32
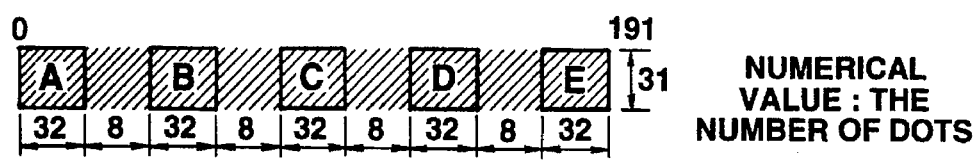
FIG.33
A B C D E
F G H I J

THREE-DIMENSIONAL IMAGE CREATION DEVICES

BACKGROUND OF THE INVENTION

1. Field of the Invention

The present invention relates to three-dimensionally visible recognizable image creation devices, and more particularly to a three-dimensional image creation device which creates a three-dimensionally visible image, prints the image on a printing medium with a printer and/or displays the image on a display.

2. Description of the Prior Art

RDS (Random Dot Stereogram) is generally well known as a technique for creating a three-dimensionally visible image (which can be hereinafter referred to as a "three-dimensional image"). In the RDS, when we view a three-dimensional image three-dimensionally, we pay attention to the fact that our right and left eyes view different positions of the image to express the respective images which our right and left eyes view with many dots to express one three-dimensional image. We adjust the respective distances among many dots which our right and left eyes view to give a three-dimensional feeling to an object expressed in the image.

A further generally well-known method of creating a thee-dimensional image includes the steps of arranging a plurality of different characters repeatedly at constant cycles to create a background of the image and arranging the plurality of different characters at cycles different from the former cycle to cause any figure to be relieved/sunken against the background. Thus, prints such as books with three-dimensionally visible images created by those techniques are marketed.

Conventionally, experts skilled in the technique of creating such three-dimensional images use an electronic device such as a personal computer to process data to thereby create three-dimensional image data. More particularly, in the RDS, the expert creates a plane original image (a regular image which we view usually) with a graphic editor or the like and creates a three-dimensionally visible image from the original image, using the RDS. In the further method, the user must, for example, use a word processor to lay out the configuration of a figure, and sequentially inputs characters to the configuration of the figure to create a three-dimensional image. The user must further create a plate for printing on the basis of the three-dimensional image data so obtained and make a large number of prints with a printer, using the plate.

However, in those conventional three-dimensional image creation systems, the user is required to have a special knowledge of the creation of a three-dimensional image, and to spend much labor in data inputting/processing. Thus, only a small percent of the experts can create a three-dimensional image, and general people only buys and enjoys books with printed three-dimensional images.

SUMMARY OF THE INVENTION

It is therefore an object of the present invention to provide a thee-dimensional image creation device in which anybody is able to create a three-dimensional image and print it on a printing medium at home or the like.

It is another object of the present invention to provide a three-dimensional image creation device which the user can create a three-dimensional image in a simple operation involving inputting any data without performing a difficult operation and print it on a printing medium.

It is a further object of the present invention to provide a three-dimensional image creation device which is capable of easily creating a three-dimensional image which, for example, is created conventionally by repeated arrangement of a plurality of characters and printing the image on a printing medium.

It is a still further object of the present invention to provide a three-dimensional image creation device which is capable of easily creating an original image, creating a three-dimensional image easily from the original image, using RDS, and printing the three-dimensional image on a printing medium.

In order to achieve those objects, the present invention provides a three-dimensional image creation device including:

printing means for heating a printing head on the basis of printed data, and thermally transferring ink in a thermally melted ink ribbon by the heated printing head to a printing medium for printing purposes;

data storage means for storing data for creating a three-dimensional image;

three-dimensional image creating means for creating three-dimensional image data visible three-dimensionally on the basis of the data stored in the data storage means;

three-dimensional image data storage means for storing the three-dimensional image data created by the three-dimensional image creating means; and print controlling means for feeding as printed data the three-dimensional image data stored in the three-dimensional image data storage means to printing means to heat and drive the printing head.

According to such arrangement, three-dimensional image data is created by the three-dimensional image creating means on the basis of the data for creating a three-dimensional image stored in the data storage means. The created data can be thermally transferred to a printing medium with a simple thermal printer used very often generally. Therefore, anybody can create, print and enjoy the three-dimensional image at home.

In order to achieve the above objects, the present invention provides a three-dimensional image creation device including:

input means for inputting to the creation device first and second data;

data storage means for storing the input first data;

bit map pattern storage means for storing the input second data in the form of a bit map pattern of a figure;

read means for sequentially reading bit data of the bit map pattern stored in the bit map pattern storage means;

three-dimensional image creating means for creating three-dimensionally visible image data by sequentially arranging the first data stored in the data storage means in accordance with the values of the bit data read sequentially by the reading means; and printing means for driving a printing head to print the three-dimensional image data created by the three-dimensional image creating means on a printing medium.

According to such arrangement, in the present invention, three-dimensional image data can easily be created only by inputting first and second data at the inputting means. The created data can be printed on a printing medium by the printing means which includes a thermal printing head. Thus, anybody can easily print any three-dimensional image at home.

In order to achieve the above objects, the present invention provides a three-dimensional image creation device including:

bit map pattern storage means for storing a bit map pattern of a figure to be expressed three-dimensionally;

read means for sequentially reading bit data on the bit map pattern stored in the bit map pattern storage means;

three-dimensional image creating means for creating three-dimensionally visible image data by repeatedly arranging a data string having a first cycle in correspondence to the bit data read by the read means in a background of the figure, and by repeatedly arranging a data string having a second cycle different from the first cycle in correspondence to the bit data read by the read means in the figure; and printing means for driving a printing head to print the three-dimensional image data created by said three-dimensional image creating means on a printing medium.

According to such arrangement, in the present invention, a three-dimensional image which is created by repeatedly arranging data strings can be created easily and printed on a printing medium.

In order to achieve the above objects, the present invention provides a three-dimensional image creation device including:

data storage means including a memory for storing data which is used to create a three-dimensional image and a pointer for pointing out any one item of the data stored in the memory means;

saving means for saving any item of the data stored in the data storage means;

bit map pattern storage means for storing a bit map pattern of a figure having a relieved impression and composed of the data;

read means for sequentially reading bit data on the bit map pattern stored in the bit map pattern storage means;

last data storage means for storing the bit data read by the read means;

three-dimensional image creating means for creating three-dimensionally visible image data, by (a) comparing the bit data read by the read means with the bit data stored in the data storage means; (b) saving that of the data stored in the data storage means and pointed out by the pointer when the value of the bit data read by the read means changes from a first value to a second value; then arranging the data pointed out by said pointer; and updating the pointer; (c) inserting and arranging the data saved at the position pointed out by said pointer of said data storage means when the value of the bit data read by the read means changes from the second value to the first value; and updating the pointer; and (d) arranging the data pointed out by the pointer of said data storage means when no value of the bit data read by the read means changes; and updating the value of the pointer; and printing means for driving a printing head to print the three-dimensional image data created by the three-dimensional image creating means on a printing medium.

According to such arrangement, in the present invention, a three-dimensional image which is created by arranging data which is used to create the three-dimensional image can be created easily and printed on a printing medium.

In order to achieve the above objects, the present invention provides a three-dimensional image creation device including:

part pattern storage means for storing a plurality of part pattern data for each of a plurality of parts which constitute any image;

image creating means for creating image data by selecting a plurality of part pattern data, one data item from among the respective part pattern data for each part stored in the part pattern storage means and synthesizing the selected plurality of part pattern data;

read means for sequentially reading the respective dot data on a dot pattern forming the image data created by the image creating means;

three-dimensional image creating means for creating three-dimensionally visible three-dimensional image data by calculating the distance between two predetermined dots in accordance with each of the dot data read by the read means and setting two dots having the calculated distance therebetween; and printing means for driving a printing head to print the three-dimensional image data created by the three-dimensional image creating means on a printing medium.

According to such arrangement, in the present invention, image data which will form an original image can easily be created by the image creating means. Three-dimensional image data can easily be created from the original image by the three-dimensional image creating means and can be printed on a printing medium by the printing means.

BRIEF DESCRIPTION OF THE DRAWINGS

FIGS. 5A–5H illustrate a process sequence for forming a character "A" of FIG. 4 as a three-dimensional image, using repeated characters "A,B,C,D";

FIG. 6 shows the result of the process performed in FIG. 5;

FIGS. 16A, 16B and 16C illustrate RDS;

FIGS. 17A, 17B, 17C illustrate RDS;

FIG. 27 illustrates one example of data stored in an individual data RAM of FIG. 26;

FIG. 31 illustrates one example of a method of printing of a three-dimensional image on a document performed by the three-dimensional image creation device of FIG. 30;

FIG. 32 illustrates a pattern of character development in a document development area in the three-dimensional image creation device of FIG. 30;

FIG. 33 illustrates one example of input data in the three-dimensional image creation device of FIG. 30;

DESCRIPTION OF THE PREFERRED EMBODIMENTS

A three-dimensional image creation device as a first embodiment of the present invention will be described with reference to the accompanying drawings.

Figure 1:
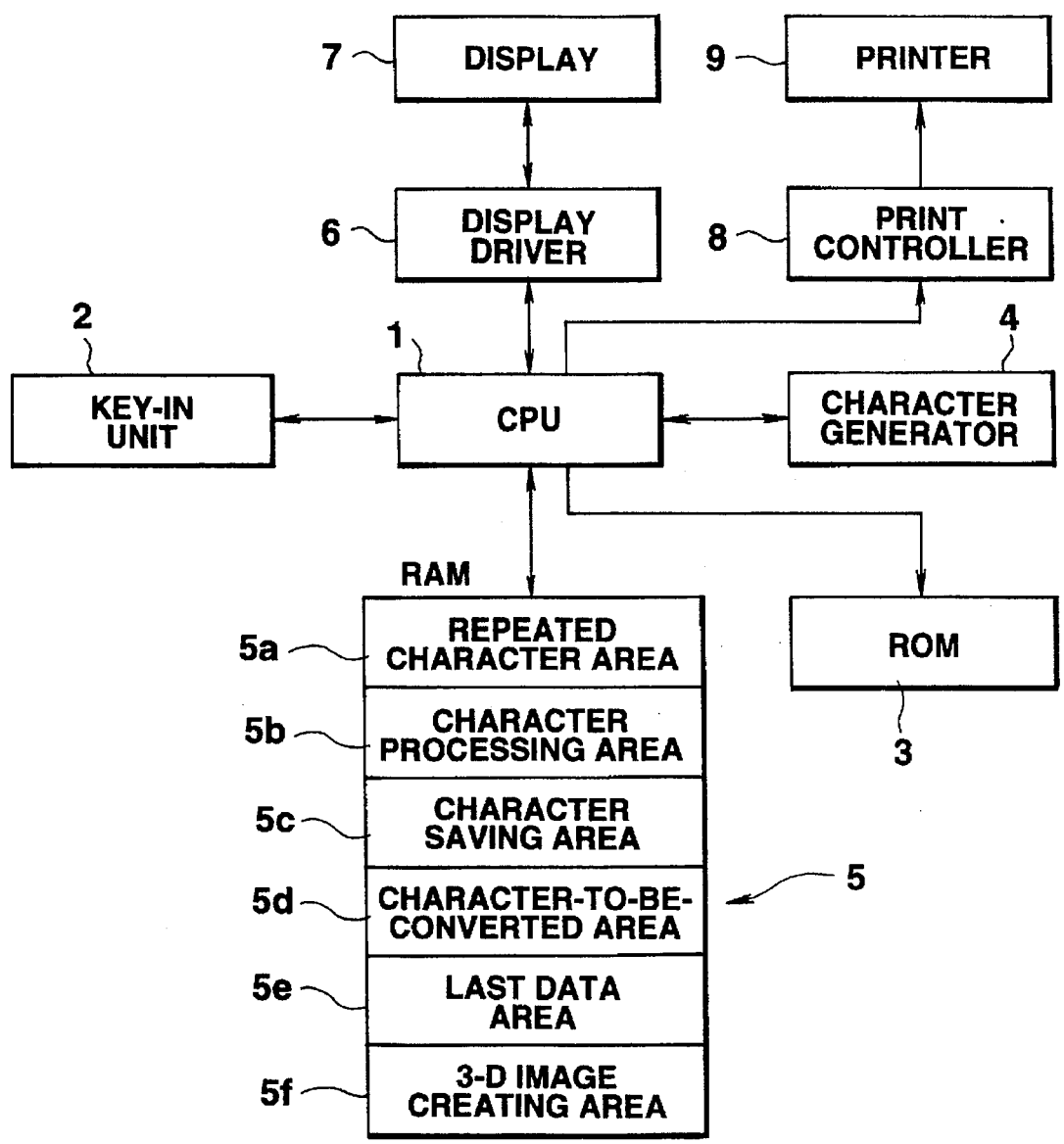
FIG. 1 is a block diagram of a three-dimensional image creation device as a first embodiment of the present invention.

FIG. 1 shows a circuit structure of a three-dimensional image creation device as the first embodiment. As shown in FIG. 1, the device includes a CPU 1, a key-in unit 2 connected to the CPU 1, a ROM (Read Only Memory) 3 connected to the CPU 1, a character generator 4 connected to the CPU 1, a RAM (Random Access Memory) 5 connected to the CPU 1, a display driver 6 connected to the CPU 1, a display 7 connected to the display driver 6, a print controller 8 connected to the CPU 1, and a printer 9 connected to the print controller 8.

The CPU 1 is composed of a microprocessor or the like taking the form of a chip and operated in accordance with a control program stored in the ROM 3 to control the whole device. Especially, in the present embodiment, the CPU 1 controls the inputting of data to create a three-dimensional image, a process for creating a three-dimensional image, and the outputting (display/printing) of the created image.

The key-in unit 2 includes character and numeral keys and a three-dimensional image creation key, and keys in data/commands to the CPU 1.

The ROM 3 stores programs for controlling the operation of the CPU 1 in the device, and for example, stores a three-dimensional image creation process program (FIGS. 2 and 3), a character inputting program, and a print processing program.

The character generator 4 includes a ROM which stores dot pattern data on the respective characters keyed in at the key-in unit 2.

The RAM 5 includes a repeated character area 5a, a character processing area 5b, a character saving area 5c, a character-to-be-converted area 5d, a last data area 5e and a three-dimensional image creation area 5f.

The repeated character area 5a stores repeated character (character string) data input from the key-in unit 2 to create a three-dimensional image.

The character processing area 5b has a pointer which is used to process repeated characters.

The character saving area 5c is used to save any characters stored in the character processing area 5b.

The character-to-be-converted area 5d stores figure data (in the present embodiment, character data) to be expressed three-dimensionally in the form of a bit map pattern.

The last data area 5e stores the last processed bit data on the bit data pattern stored in the character-to-be-converted area 5d.

The three-dimensional image creating area 5f stores three-dimensional image data during and after creation.

The display driver 6 displays character data keyed in at the key-in unit 2 and created three-dimensional image data on the display 7 which is composed, for example, of a dot matrix liquid crystal display, in accordance with instructions from the CPU 1.

The print controller 8 causes the printer 9 to print three-dimensional image data created in accordance with the instructions from the CPU 1.

The printer 9 used is, for example, a regular thermal printer although the contents of the printer 9 are not shown. The printer 9 has a platen on which recording paper is placed, a carriage which runs along the platen, a thermal printing head which is mounted on the carriage and an ink ribbon coated with a thermally melted ink. The printing head has a plurality of line-like heaters traversing the moving path of the printing head and extending along the path of feed of the recording paper.

In the printer 9, the plurality of heaters of the printing head are caused to produce heat on the basis of print data which includes three-dimensional image data stored in the three-dimensional image creating area 5f while being moved across the printing paper to thermally transfer ink in the ink ribbon to the recording paper for printing purposes. When the printing head ends a single printing operation performed by moving across the recording paper (in the main scanning direction), the platen rotates to feed the recording paper by a constant length and the printing head returns to its print starting position to perform the next single printing operation in the main scan direction. By repetition of these printing operations, the whole three-dimensional image data stored in the three-dimensional image data creating area 5f is printed. The print controller 8 controls a series of printing operations involving the heating operation of the heaters of the printing head, the movement of the printing head caused by the drive of the carriage, the attitude of the printing head moving toward/away from the recording paper, and feed of the recording paper due to the rotation of the platen, in accordance with instructions from the CPU 1.

The operation of the three-dimensional image creation device of the first embodiment will be described with reference to the flowchart of FIGS. 2 and 3.

When a three-dimensional image is created on the basis of the repeated characters, the user operates the three-dimensional image creation key arranged in the key-in unit 2. The CPU 1 detects the operation of that key and starts the process of FIG. 2 in accordance with the control program stored in the ROM 3.

First, the CPU 1 causes the display driver 6 to display a picture on the display 7 for pressuring the user to input repeated characters (a character string) to create a three-dimensional image (step M1). If the user inputs character string data, using the character keys, etc., in the key-in unit 2 in accordance with the display (step M2), the CPU 1 converts the character string data through the character generator 4 to a dot pattern and displays the pattern through the display driver 6 on the display 7. When the user ends the key-in operation of the repeated character data, the CPU 1 stores the repeated character data in the repeated character area 5a.

The CPU 1 then causes the display driver 6 to display on the display 7 a picture for pressing the user to input a character to be converted or to be expressed three-dimensionally (in this case, a character to be relieved against the background) (step M3).

When the user inputs the character data, using the character key, etc., in the key-in unit 2 in accordance with the display (step M4), the CPU 1 converts the character data through the character generator 4 to a dot pattern, displays same through the display driver 6 on the display 7, and stores data on the dot pattern in the character-to-be-converted area 5d.

Thereafter, a process for creating a three-dimensional image is performed (step M5), which will be described later with reference to FIG. 3.

When the three-dimensional image is completed, the CPU 1 causes the display driver 6 to display the three-dimensional image data stored in the three-dimensional image creating area 5f on the display 7 and to cause the printer to print the data through the print controller 8 (step M6).

At this time, as shown in FIG. 6, the CPU 1 annexes two marks "a" on the top of the created image and displays and/prints the resulting image.

Next, the three-dimensional image creation process performed at step M5 of FIG. 2 will be described in more detail with reference to FIG. 3.

First, the CPU 1 sets in a first row and a first column the position of reading the dot pattern data stored in the character-to-be-converted area 5d and initializes the character saving area 5c, last data area 5e and three-dimensional image creating area 5f (step N1).

The CPU 1 then copies the repeated character data stored in the repeated character area 5a into the character processing area 5b and further sets the pointer so as to point out the head of the character string dada which stores the pointer of the character processing area 5b to initialize the character processing area 5b (step N2).

The CPU 1 then reads the bit data, at the reading position, of the bit pattern data stored in the character-to-be-converted area 5d (step N3).

The CPU 1 then determines the value of the read bit data (step N4). If the value of the read bit data is "0", control passes to step N5 while if the value of the read bit data is "1", control passes to step N15.

At step N5, the CPU 1 then determines whether the last data (last processed bit data) stored in the last data area 5e is "1".

If not, the CPU 1 writes (arranges) character data pointed out by the pointer of the character processing area 5b at a corresponding position of the three-dimensional image creating area 5f (step N6).

Thereafter, the CPU 1 moves the pointer of the character processing area 5d to a position indicating the next character data (if the pointer points out the end character data, the CPU 1 moves the pointer to a position which points out the head character data)(step N7). At step N7, the CPU 1 further stores the current bit data read at step N3 in the last data area 5e.

Thereafter, the CPU 1 determines whether the current processed bit data of the bit pattern data stored in the character-to-be-converted area 5d is in the end column of a row (step N8). If not, the CPU 1 updates or increments the column number at the reading position by one (step N9). Control then returns to step N3 where the CPU 1 reads the bit data, in the next column, of the bit pattern data stored in the character-to-be-converted area 5d.

When at step N8 the CPU 1 determines that the current processed bit data is of the end column, the CPU 1 determines whether the current processed bit data is the one, in the end row, of the bit pattern data stored in the character-to-be-converted area 5d (step N10). If not, the CPU 1 updates or increments the row number at the reading position (step N11). Control then returns to step N2, where the CPU 1 reads bit data, in the head column of the next row, of the bit pattern data stored in the character-to-be-converted area 5d.

When at step N5 the CPU 1 determines that the last data is "1", the CPU 1 reads and inserts the character data saved in the character saving area 5c at a position pointed by the pointer in the character processing area 5d (step N12), writes (arranges) the inserted character data at a corresponding position in the three-dimensional image creating area 5f (step N13), and deletes character data stored in the character saving area 5c (step N14). Then, control passes to step N7.

At step N4 when the CPU 1 determines that the current read bit data is "1", control passes to step N15, where the CPU 1 determines whether the last data stored in the last data area 5e is "0".

If not, the CPU 1 writes the character data pointed by the pointer in the character processing area 5b at a corresponding position in the three-dimensional image creating area 5f (step N16). Thereafter, control passes to step N7.

When the CPU 1 determines at step N15 that the last data is "0", the CPU 1 saves the character data at the position pointed by the pointer into the character processing area 5b into the character saving area 5c (step N17), leftwards puts close the character data placed on the right-hand side of the saved character data (step N18) and writes that of the close put character data pointed out by the pointer at a corresponding position in the three-dimensional image creating area 5f (step N19). Then, control passes to step N7.

By repetition of the above operations, the CPU 1 automatically performs the process involving sequential arrangement of character data stored in the character processing area 5d in the three-dimensional creating area 5f in correspondence to the bit map pattern stored in the character-to-be-converted area 5b, removal of the character data corresponding to and at the beginning of the data to be relieved and arrangement of the next character data in the three-dimensional creating area 5f, and the arrangement of the deleted character data in the three-dimensional creating area 5f when the character data to be relieved against the background ends. Thus, the number of characters of the character string arranged cyclically in the image portion to be expressed three-dimensionally is reduced (that is, the repetition cycle of characters is reduced) compared to the number of characters of the character string arranged cyclically in the background to thereby give a feeling that the image is relieved against the background.

Figure 2:
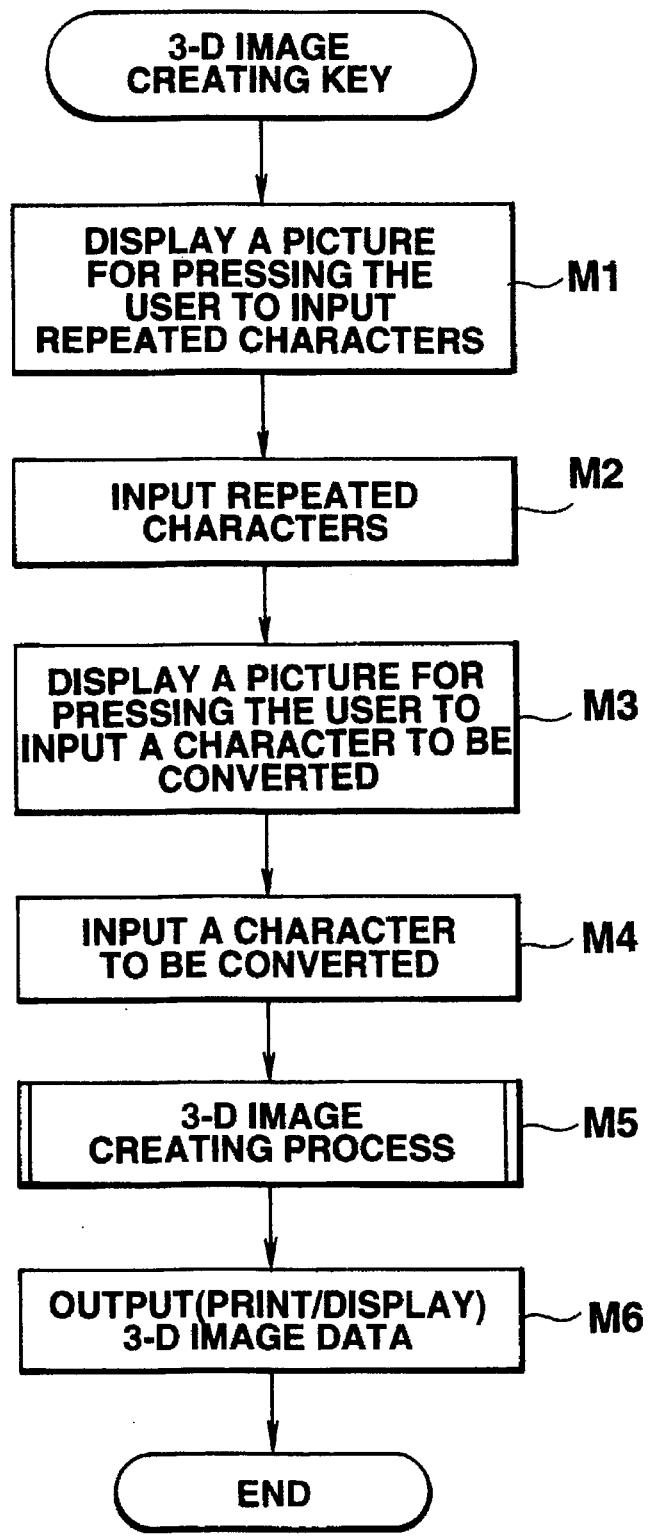
FIG. 2 is a flowchart indicative of the operation of the three-dimensional image creation device of FIG. 1.
Figure 3:
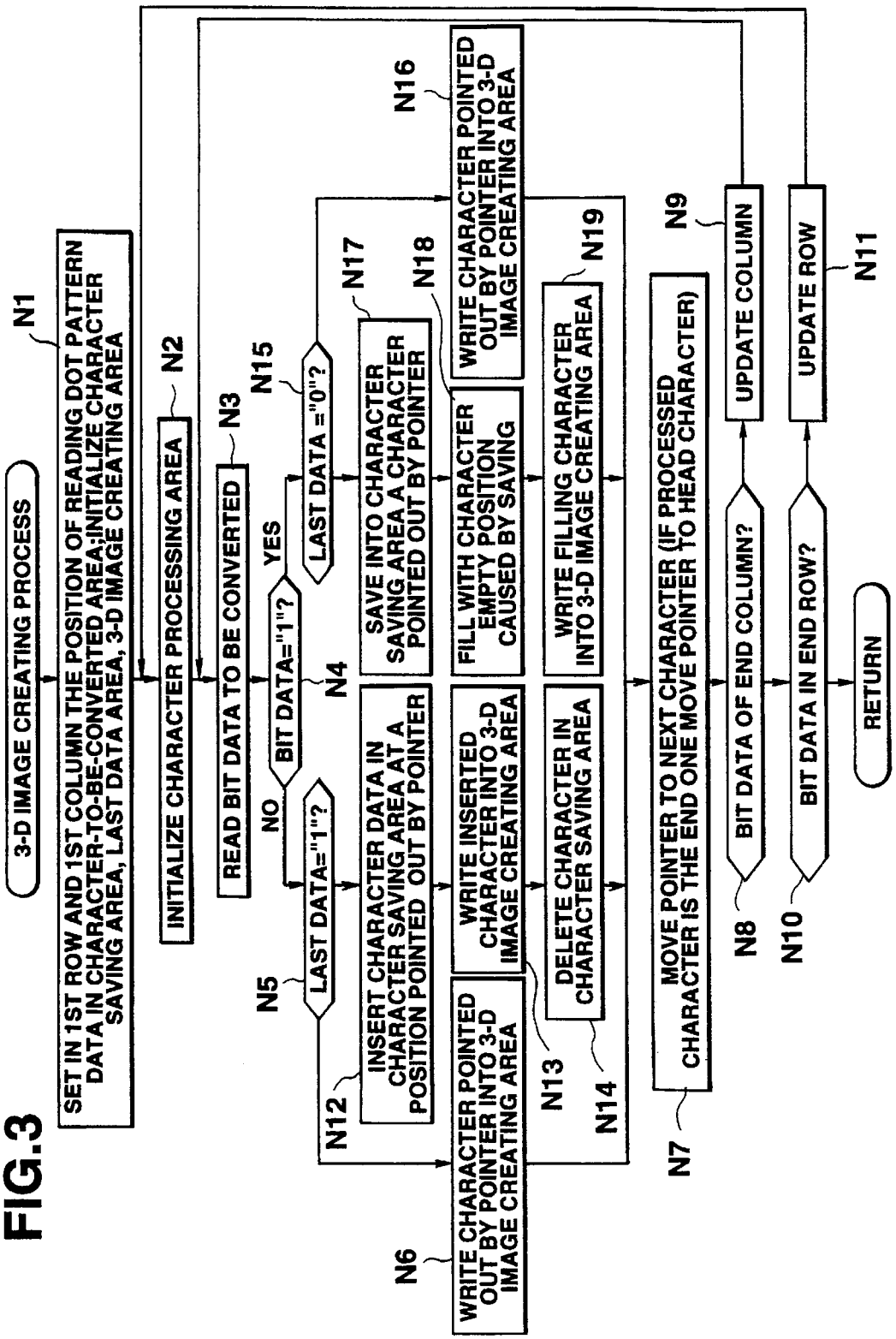
FIG. 3 is a flowchart indicative of the details of a three-dimensional image creation process of FIG. 2.

The process of FIGS. 2 and 3 will be illustrated with characters (to-be-converted) to be relieved being "A" and the repeated characters being "A,B,C,D".

In this case, the user operates the key-in unit 2 and the three-dimensional image creation key to key in "ABCD" as repeated character data (FIG. 2, step M2) and further keys in a character to be converted "A" (step M4). The character data "ABCD" keyed in at step M2 is stored in the repeated character area 5a. The character data "A" to be relieved is converted, for example, to a dot pattern of 21 rows×32 columns of FIG. 4 by the character generator 4 and stored in the character-to-be-converted area 5d. In this case, a white dot and a black dot are handled as "0" and "1", respectively, in the dot pattern of FIG. 4.

Thereafter, the three-dimensional image creation process of FIG. 3 is performed as follows.

First, the CPU 1 sets a first row and a first column of the character-to-be-converted bit data as its reading position (step N1). As shown in FIG. 5A, the CPU 1 copies the repeated character data "ABCD" stored in the repeated character area 5a into the character processing area 5b and sets the pointer of the character processing area 5b at the head character "A" (step N2). The CPU 1 then reads bit data of the first row and first column of the bit pattern of FIG. 4 as data to be processed from the character-to-be-converted area 5d (step N3).

Figure 4:
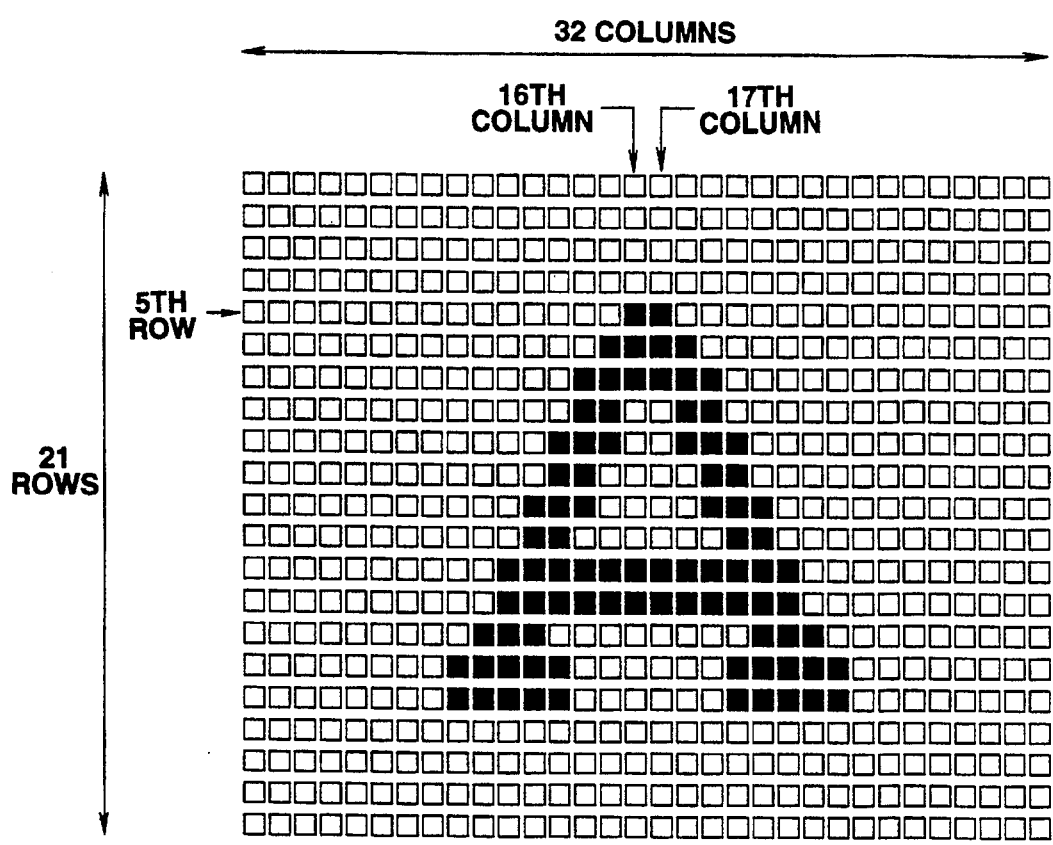
FIG. 4 illustrates one example of bit map pattern data (to be converted) stored in a character-to-be-converted area.

Since the first row and first column of the bit pattern of FIG. 4 is "white" or "0", control passes from step N4 to N5. In this case, since there is no bit data processed before, control passes from step N5 to N6, the CPU 1 writes the character data "A" pointed out by the pointer of the character processing area 5b at the position of the first row and first column of the three-dimensional image creation area 5f, as shown in FIG. 5B (step N6).

Thereafter, the CPU 1 moves the pointer so as to point out the character data "B" and sets bit data "0" in the last data area 5e (step N7). Since the current processed bit data of the first row and first column is not the one of the end column, the CPU 1 updates the next reading position to the first row and a second column and control then returns to step N3 (steps N8, N9).

Since all the bit data, in the first row, of the bit pattern data of FIG. 4 is "0", control iterates the processing at the steps N3–N9 to write the character data "ABCD" repeatedly in the first row of the three-dimensional image creation area 5f.

When the processing of bit data, in the first row and 32th column, of the bit pattern data of FIG. 4 stored in the character-to-converted area 5d ends, the CPU 1 determines at step N8 that the bit data of the end column has been processed. Control then passes to step N10. In this case, if the bit data processed this time is not in the end row, the CPU 1 updates the row number to 2 at step N11 and the column number as 1 at the reading position, and control then returns to step N2.

Since all the bit data, in the second row, of the bit pattern data of FIG. 4 is also "0", the CPU 1 repeatedly writes character data "ABCD" in the second row of the three-dimensional image creation area 5f as in the first row. The CPU 1 performs similar operations for the third and fourth rows.

The CPU 1 iterates similar operations on the bit data in the first-fifteenth columns for the fifth row of the bit pattern data of FIG. 4. Since, for example, bit data in the fifteenth column and the fifth row is "0" and the pointer of the character processing area 5b points out character data "C", as shown in FIG. 5C, the CPU 1 writes the character data "C" at the position determined by the fifth row and the fifteenth column of the three-dimensional image creation area 5f.

Control then passes to processing of bit data in the fifth row and sixteenth column. This bit data is "1". Therefore, control passes from step N4 to N15, where the CPU 1 determines that the last data (the bit data in the fifth row and fifteenth column) is "0". Thus, the CPU 1 saves character data "D" pointed by the pointer of the character processing area 5b into the character saving area 5c, as shown in FIG. 5D (step N17).

As shown in FIG. 5(E), the character string data in the repeated character area is "ABC" (step N18) and the pointer points out the character data "A" next to the character data "D", so that the CPU 1 writes the pointed character data "A" at the position of the fifth row and sixteenth column of the three-dimensional image creation area 5f (step N19).

Thereafter, as shown in FIG. 5F, the CPU 1 moves the pointer to a position indicative of the next character data "B" to set "1" in the last data area 5e (step N7). Thus, control returns to step N3 through steps N8 and N9.

Control then passes to the processing of the bit data in the fifth row and the seventeenth column. This bit data is "1" and the last data is also "1". Thus, control passes through steps N4 and N15 to step N16, where the CPU 1 writes the character data "B" pointed by the pointer in the fourth row and a seventeenth column of the three-dimensional image creation area 5f, as shown in FIG. 5G (step N19).

Control then passes to the processing of bit data in the fifth row and eighteenth column. This bit data is "0", so that control passes from step N4 to N5, where the CPU 1 determines that the last data is "1" and inserts the character data "D" saved in the character saving area 5c at the position pointed out by the pointer (step N2), writes the inserted character data "D" in the fifth row and eighteenth column of the three-dimensional creation area 5f (step N13), and deletes the character data "D" stored in the character saving area 5c (step N14). Thereafter, the CPU 1 updates the value of the pointer so as to point out a position indicative of the character data "C" (step N7).

Since the bit data of FIG. 4 in the 19th–32th columns for the fifth row are all "0" and the last or previous data is also "0", the processing at steps N3–N9 is repeated and the CPU 1 writes character data "ABDC" repeatedly in the three-dimensional image creation area 5f.

The CPU 1 then iterates similar operations for the sixth and subsequent rows. When the CPU 1 ends the processing of bit data in a 21th row and 32th column of the bit pattern data of FIG. 4 stored in the character-to-be-converted area 5d, the respective characters A,B,C,D are repeated at the same cycle in the background of the three-dimensional image creation area 5f although the order of the character arrangement can differ, for example, like "ABCD", "ABDC", "ACDB", etc. For the image portion "A" to be relieved against its background, three of the characters A,B,C,D except for one are repeatedly arranged. That is, in the image portion "A" to be relieved against the background, the cycle of regular repetition of the characters A,B,C,D is uneven. As a result, a character arrangement pattern is created which gives an impression of the image "A" being relieved against the background composed of repeated character strings of characters A–D.

Thereafter, the CPU 1 determines at steps N8 and N10 that the answer is "YES". Control then passes to step M6 of FIG. 2, where the CPU 1 finally annexes two black dots "a" indicative of the viewing positions to the top of the character arrangement stored in the three-dimensional image creation area 5f, displays and/or prints it, as shown in FIG. 6.

As described above, according to the present embodiment, a three-dimensional image composed of a character arrangement is automatically created only by inputting character data to be relieved against the background and repeated character data required to create the character to be relieved.

In this embodiment, the character data saved in the character saving area 5c is returned to the character processing area 5b when the character data to be relieved ends (step N12). Alternatively, character data different from the saved character data may be inserted at a position pointed by the pointer of the character processing area 5b. Preferably, the character data to be inserted is different from any character data stored in the character data processing area 5b at that time. In this case, the character data saved at step N17 may be abandoned.

While the example in which the repeated characters (the character string to become the background) are "A,B,C,D" and the character to be converted (the image to be relieved) is "A" has been illustrated specifically, the repeated characters are not limited to alphabetic characters, but may be a numeral, a Chinese character, a sign or a pictorial character. Preferably, the repeated characters are different from each other. A character to be converted (an image to be relieved) may be a figure such as a circle, a triangle, a rectangle or another figure in place of characters.

Figure 7A:
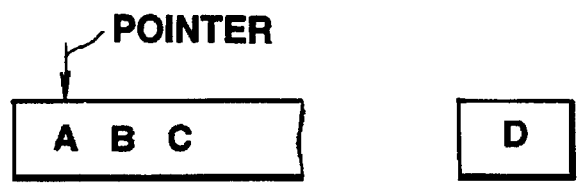
FIGS. 7A–7C illustrate a process for creating a sunken three-dimensional image having an impression sunken against the background.

While in the present embodiment the relief of an image (character) has been described, the image may be sunken against the background, which will be described next. As shown in FIG. 7A, three character "ABC" data is stored beforehand in the character processing area 5b and any character data "D" is stored beforehand in the character saving area 5c. Preferably, the respective character data are different from each other. The CPU 1 then sequentially reads bit data items of the bit pattern, for example, of a character "A" stored in the character-to-be-converted area 5d and sequentially and repeatedly arranges the three character data "ABC" items stored in the character processing area 5b in accordance with the respective values of the bit data items.

Figure 7B:
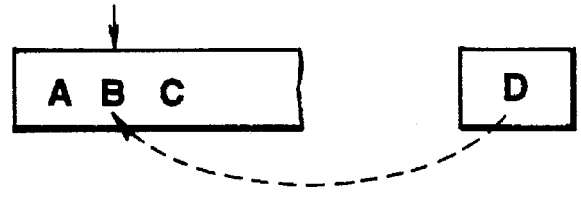

When the bit data changes from "0" to "1", the CPU 1 inserts the character data stored in the character saving area 5c at the position of the character data "B" pointed out by the pointer of the character processing area 5b at that time, as shown in FIG. 7B, and sequentially and repeatedly arranges the character string data "ADBC" stored in the character processing area 5b, in the 3-D image creating area 5f.

Figure 7C:
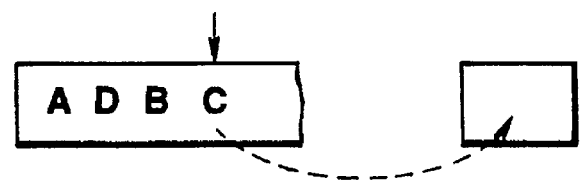

When the bit data changes from "1" to "0", the CPU 1 deletes the character data "C" pointed out by the pointer of the character processing area 5b at that time and saves the deleted character data into the character saving area 5c, as shown in FIG. 7C. Thereafter, the CPU 1 sequentially arranges the character string data "ADB", stored in the character processing area 5b in the 3-D image creating area 5f.

In this arrangement, the number of characters of a character string arranged cyclically in an image portion to be expressed three-dimensionally (in the example of FIG. 7, four characters) is larger (that is, the repetition cycle of characters is greater) than the number of characters of a character string arranged cyclically in the background (in the example of FIG. 7, three characters), to thereby give a sense of the image portion being sunken against the background.

In the first embodiment, the repetition cycle of characters is changed from 4 to 3 to express any image so as to have an relieved sense whereas the repetition cycle is changed from 3 to 4 to express any image so as to have a sunken sense. However, for example, by changing the repetition cycle of characters from 5 to 3 or from 6 to 3, a relieved sense may be emphasized whereas by changing the repetition cycle of the characters from 3 to 5 or from 3 to 6, a sunken sense may be emphasized.

The relief or depth may be changed in a multi-gradation, for example, by setting at 6 the repetition cycle of the characters of the background; by setting at 5 the repetition cycle of the characters which gives a little relieved sense; by setting at 4 the repetition cycle of the characters to give a further relieved sense; by setting at 7 the repetition cycle of the characters to give a little sunken sense; by setting at 8 the repetition cycle of the characters to give a further sunken sense; and so on.

While the size of the dot pattern of characters to be converted has been illustrated as being 21 rows×32 columns, the size of the dot pattern is optional. While the white dot and black dot are handled as "0" and "1", respectively, white and black dots may be processed as "1" and "0", respectively.

The circuit composition of FIG. 1 and the operation of FIGS. 2 and 3 are only exemplary and the present invention is not limited to those examples. Any circuit composition and operation sequence may be employed so long as the same function is realized.

An image to be converted may be input through an image reader or data communication and stored in the character-to-be-converted area.

As described above, according to the invention of the first embodiment, only by inputting an image to be relieved or sunken against the background and data (repeated characters) to create that image, a three-dimensional viewable image is created.

Figure 8:
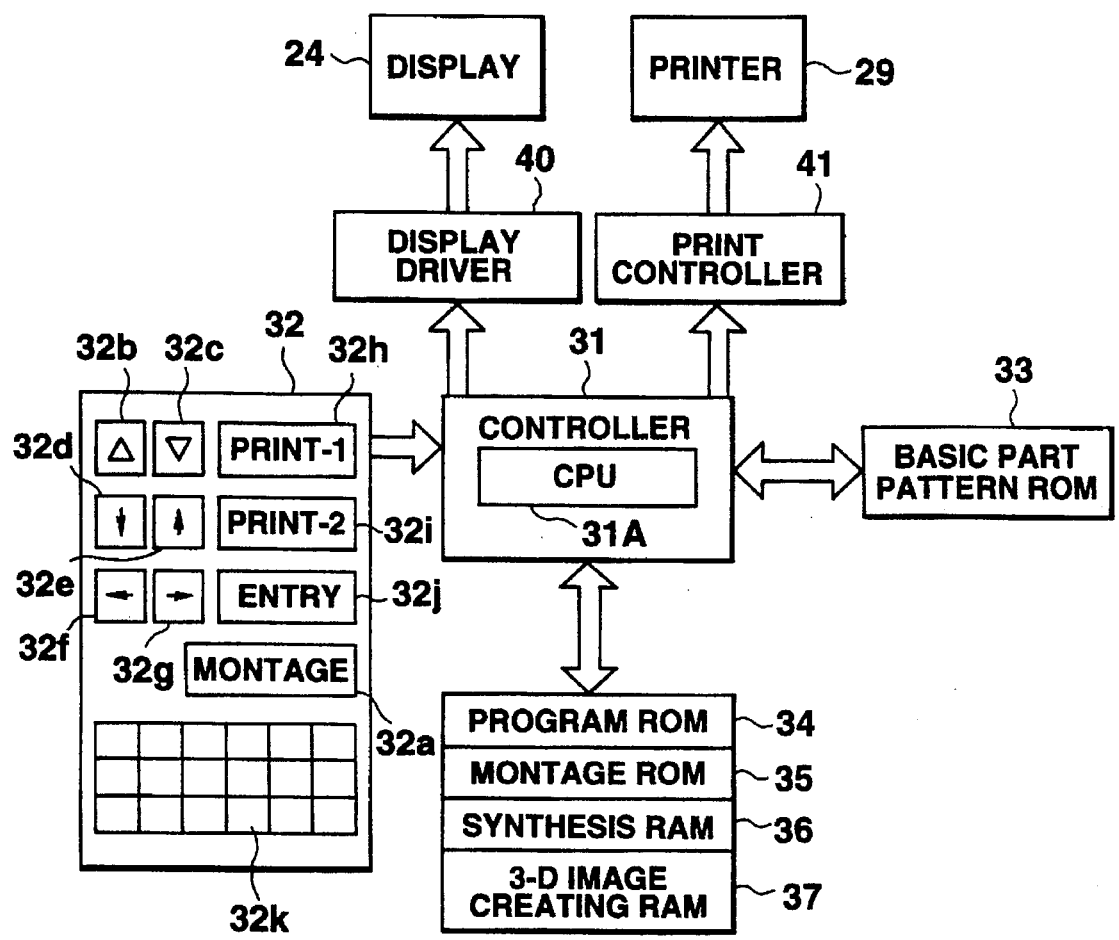
FIG. 8 is a block diagram of the structure of a three-dimensional image creation device as a second embodiment of the present invention.

A second embodiment of the present invention will be described next. FIG. 8 is a circuit block diagram of a three-dimensional image creation device as a second embodiment of the present invention.

Figure 20:
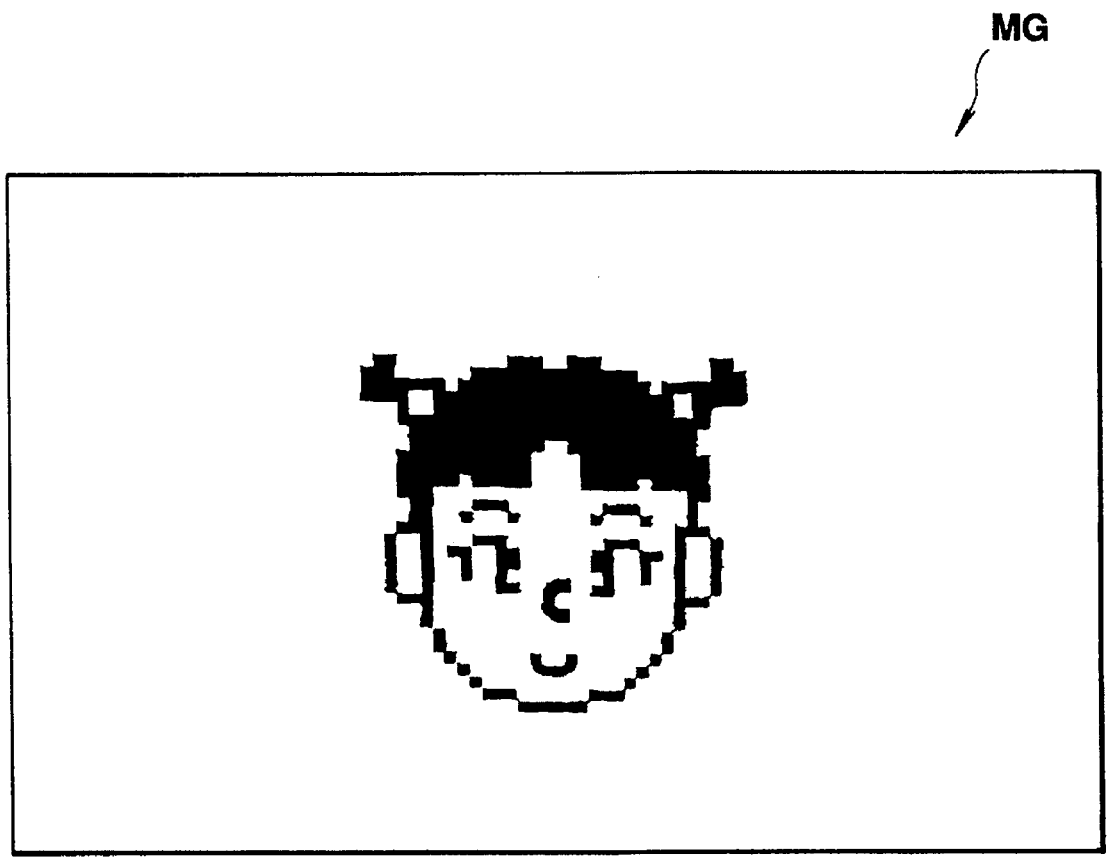
FIG. 20 illustrates one example of a montage.
Figure 21:
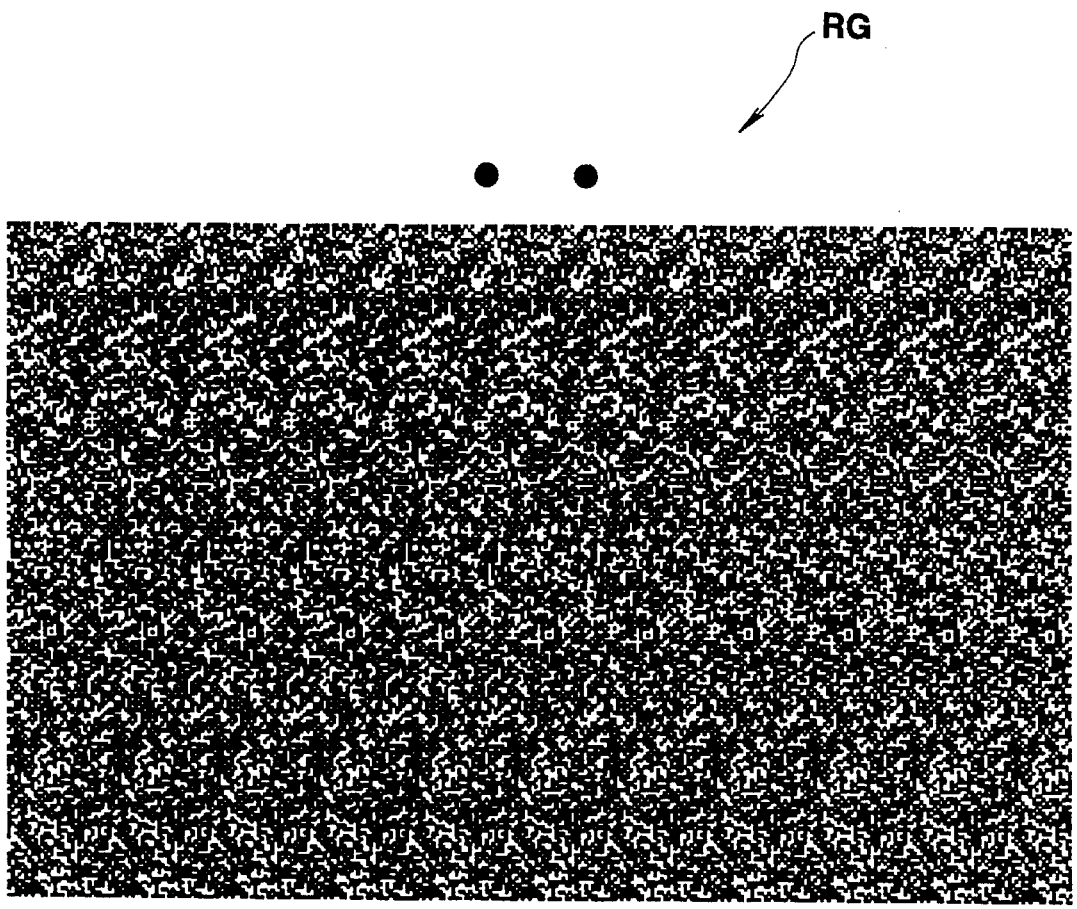
FIG. 21 shows a three-dimensional image formed on the basis of the montage of FIG. 20 in the process of FIG. 16.

The three-dimensional image creation device has the function of creating a montage image MG (FIGS. 10B and 20) by combining a plurality of patterns stored beforehand and converting the created montage image to a three-dimensional image RG, using RDS (FIG. 21).

As shown in FIG. 8, the three-dimensional image creation device as the second embodiment includes a controller 31, a key-in unit 32, a basic part pattern ROM 33, a program ROM 34, a montage RAM 35, a synthesis RAM 36, a three-dimensional image creation RAM 37, a print controller 41, a printer 29, a display driver 40 and a liquid crystal dot matrix display 24.

The controller 31 controls the operation of the respective components of the device on the basis of the key-in signals delivered from the key-in unit 32 in accordance with programs stored beforehand in the program ROM 34 to be described later in more detail. The controller 31 is composed, for example, of a CPU 31A and its peripheral circuits.

The key-in unit 32 includes a plurality of key switches to deliver data to the controller 31. The key-in unit 32 is composed, for example, of a montage creation key 32a operated when a montage creation mode is set, first and second basic montage selection keys 32b and 32c to select any one from among a plurality of basic montage images; first and second part designation keys 32d, 32e to designate a part to be changed when the montage image is created; pattern selection key 32f, 32g to select the pattern of a part designated as the one to be changed; a regular printing key (PRINT-1) 32h operated when a created montage image is printed as a regular plane image; a three-dimensional image printing key (PRINT-2) 32i operated when a created montage image is converted to and printed as a three-dimensional (3-D) image; an entry key 32j operated when the created montage data is entered, and an alphanumeric key unit 32k.

Figures 9, 10A, 10B:
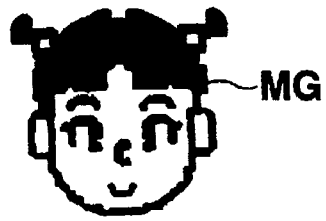
FIG. 9 illustrates one example of data stored in a basic part pattern ROM of FIG. 8.
FIG. 10A illustrates one example of data stored in a montage RAM of FIG. 8.
FIG. 10B illustrates one example of a montage formed with the data shown in FIG. 10A.

As shown in FIG. 9, the basic part pattern ROM 33 stores a plurality of figure pattern data for each of the parts which constitute a face montage image. In the second embodiment, the montage image is synthesized from patterns of the five parts, i.e., configuration, hair style, eyes, nose and mouth of a face. The basic part pattern ROM 33 stores 20 part pattern data items (No. 1– 20) for each part. Data on each part pattern is stored in the form of a matrix-like bit map (data on dots arranged in a matrix).

The program ROM 34 stores a program which controls the controller 31, for example, a data input program, a montage image creation program, and a 3-D image creation program.

The montage image RAM 35 stores pattern number data on the respective parts (contour, hair style, eyes, nose, and mouth of the face) which constitute a montage image MG, as shown in FIG. 10A. In the example of FIG. 10A, the face montage image data is composed of No. 1 pattern data on a contour, No. 8 pattern data on a hair style, No. 14 pattern data on eyes, No. 1 pattern data on a nose and No. 1 pattern data on a mouth, as shown in FIG. 9. The created montage image MG is synthesized from the respective pattern data, as shown in FIG. 10B.

The synthesis RAM 36 is an area used to create montage data by synthesizing the (dot) pattern data on the respective parts read from the basic part pattern ROM 33. The montage data formed in the synthesis RAM 36 is displayed on the display 24 through the display driver 40.

The three-dimensional image creation RAM 37 is used to convert the montage data created in the synthesis RAM 36 to three-dimensional image data, for example, using RDS.

The print controller 41 controls the operation of the printer 29 under the control of the controller 31.

The printer 29 is composed of a thermal printer similar to that used in the first embodiment. Although the details of the printer 29 are not illustrated, the printer 29 includes a platen on which recording paper is placed, a carriage which runs along the platen, a thermal printing head mounted on the carriage and an ink ribbon. The printing head has a plurality of line-like heaters extending across the moving path of the printing head and along the moving direction of the recording paper. The printer 29 causes the plurality of heaters of the printing head to generate heat on the basis of the printed data which is three-dimensional image data stored in the three-dimensional image creation RAM 37 while moving the printing head across the recording paper to thermally transfer ink in the ink ribbon to the recording paper to print the printed data on the recording paper. When a single printing operation of the printing head across the recording paper (in the main scan direction) ends, the platen rotates to feed the recording paper by a constant length and the printing head returns to its print stating position for the next printing operation in the main scanning direction. By repetition of these operations, the whole three-dimensional image data stored in the three-dimensional image creation RAM 37 is printed. The print controller 41 control the heating operation of the heaters of the printing head, the movement of the printing head caused by the movement of the carriage, the attitude of the printing head moving to/away from the recording paper, and feed of the recording paper due to the rotation of the platen in accordance with constructions from the CPU 31A.

The display driver 40 controls the displaying operation of the liquid crystal dot matrix display 24 under the control of the controller 31.

The operation of the three-dimensional image creation device of the second embodiment will next be described with reference to the flowchart of FIG. 11 which involves creating montage data by combining pattern data stored in the basic part pattern ROM 33, converting the montage data to three-dimensional image data and printing same.

Figure 12:
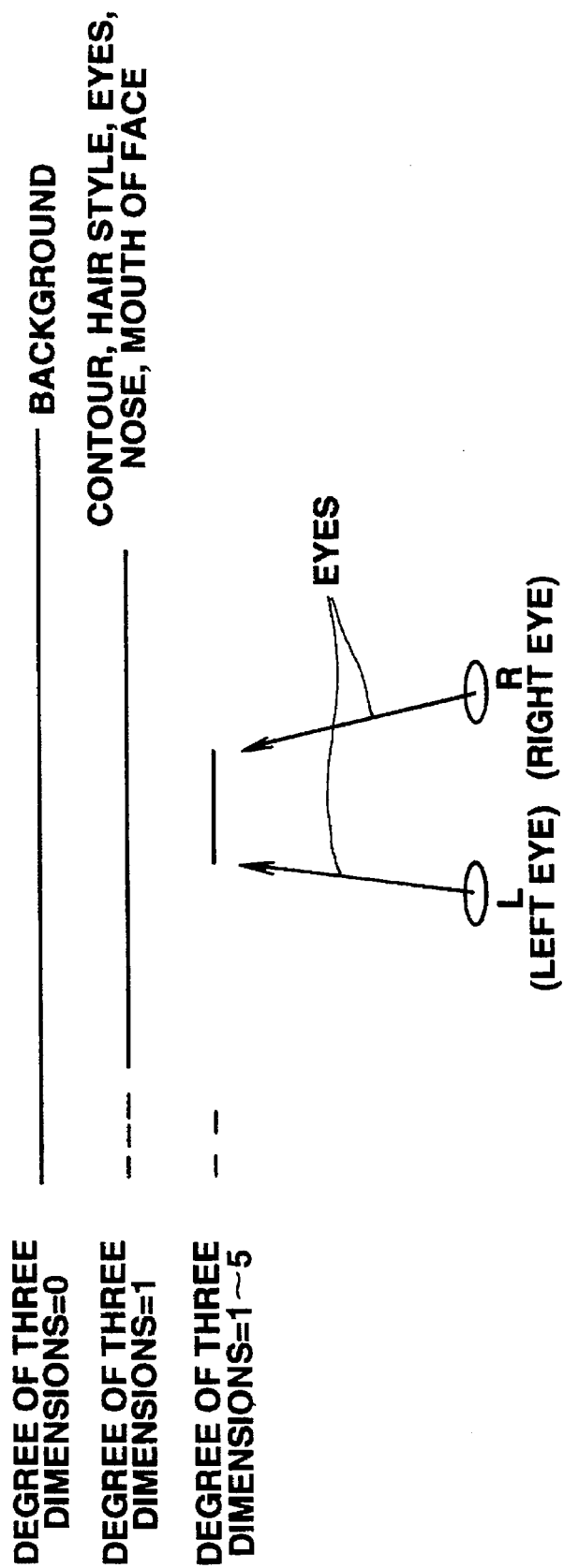
FIG. 12 illustrates a three-dimensional image created in the process of FIG. 11.

In the second embodiment, as shown in FIG. 12, the contour, hair style, eyes and mouth which constitute a face montage image relieved by a predetermined quantity (with a degree of three-dimension of "1") against the background (with a degree of three-dimension of "0") are converted to corresponding three-dimensional image data and the nose pattern data is converted to three-dimensional image data relieved by a quantity set by the user (with a degree of three-dimension of "1"–"5") against the background.

First, the user combines any pattern data of any parts stored in the basic part pattern ROM 33 to form desired montage image data in the synthesis RAM 36 (step Q1).

When the montage data created at step Q1 is printed in a regular form such as shown in FIG. 10B, the user operates a plane or regular print (PRINT-1) key 32h of the key-in unit 32, the operation of which is detected at steps Q2 and Q3. The controller 31 sequentially reads dot data on the montage image formed in the synthesis RAM 36 and causes the printer 29 to print the data through the print controller 41 (step Q4).

When the montage data created at step Q1 is converted to three-dimensional image data, using RDS, and printed, the user operates the three-dimensional print (PRINT-2) key 32i of the key-in unit 32, which is detected at steps Q2 and Q3. Thus, control then passes to step Q5, where the user keys in any one of numerical values indicative of five different gradations indicative of the heights of the nose, using the alphanumeric key unit 32k.

The controller 31 sets data on the input nose height at a variable X (at step Q6), converts the montage image data stored in the synthesis RAM 36 to three-dimensional image data in accordance with the variable X and displays and prints same (step Q7).

The details of the montage creation process performed at step Q1 will be described specifically with reference to the flowchart of FIGS. 13 and 14.

Figure 13:
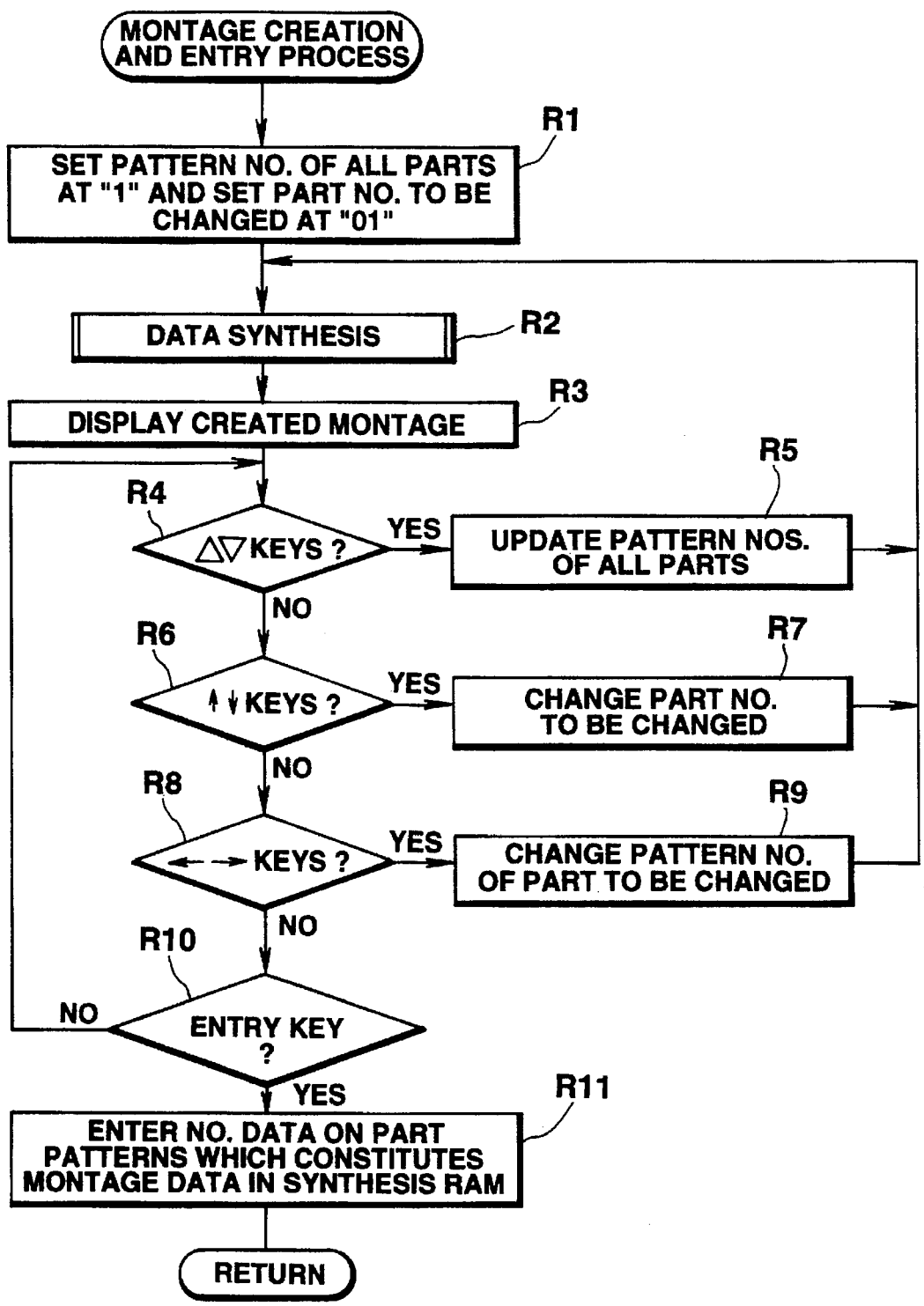
FIG. 13 is a flowchart indicative of the details of the montage creation process of FIG. 11.

When the user operates the montage creation key 32a of the key-in unit 32, the controller 31 detects this key-in operation and starts a montage creation process of FIG. 13.

First, the controller 31 sets "1" as part pattern numbers for synthesis for all the parts, data on which is stored in the basic part pattern ROM 33, and further sets "01" indicative of the contour of a face as a number indicative of a part to be changed (step R1).

The controller 31 then reads data on the patterns of the respective parts to be synthesized, transfers and synthesizes those data to and in the synthesis RAM 36 (step R2).

Figure 14:
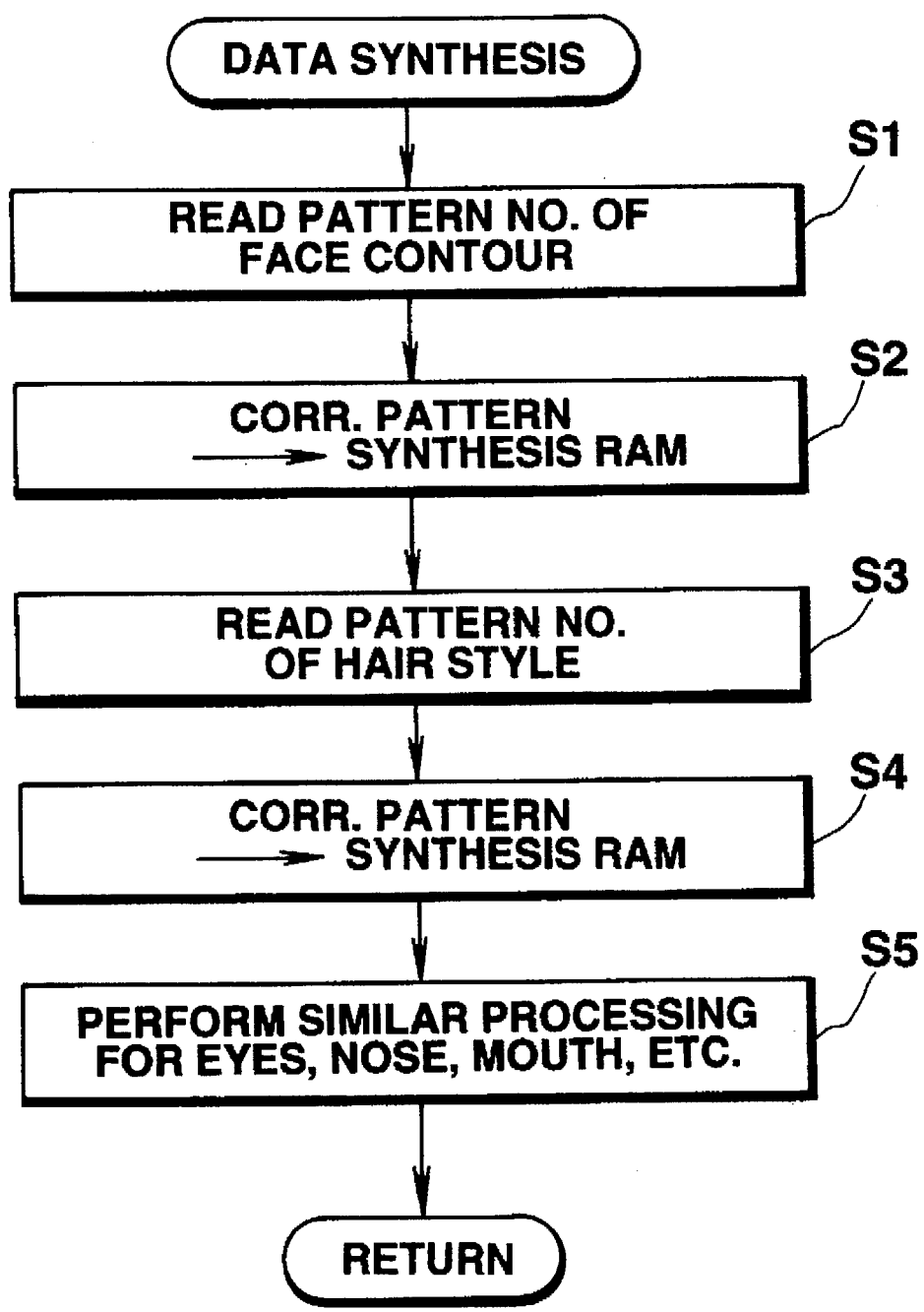
FIG. 14 is a flowchart indicative of the details of a data synthesis process of FIG. 13.

More specifically, as shown in the flowchart of FIG. 14, the controller 31 reads pattern number data on the face contour (step S1), reads pattern data corresponding to that number data from the basis part pattern ROM 33, transfers and develops the pattern data to and in the synthesis RAM 36 (step S2). The controller then reads pattern number data on a hair style to be synthesized (step S3), reads the hair style pattern data indicated by that number from the basic part pattern ROM 33, and transfers and develops the pattern data in the synthesis RAM 36 (step S4). The controller performs similar operations for the eyes, nose and mouth (step S5) and creates a montage image in the synthesis RAM 36.

The controller 31 displays the created montage image data on the display 24 (step R3 of FIG. 13).

The controller 31 then determines whether the first and second montage selection keys 32b and 32c of the key-in unit 32 have been operated (step R4). When the first montage selection key 32b has been operated, the controller increments by one all the numbers indicating the patterns of the parts to be synthesized (when the pattern number is 20, it is changed to 1) at step R5 and control then returns to step R2. When the second basic montage selection key 32c has been operated, the controller decrements by one all the numbers indicating the patterns of the parts to be synthesized (when the pattern number is 1, it is changed to 20) and control then returns to step R2.

When the controller 31 determines at step R4 that the answer is "NO", the controller determines whether the first and second part designation keys 32d and 32e of the key-in unit 32 have been operated (step R6). If the first part designation key 32 has been operated, the controller increments by one the number of the part to be changed (when the part number is 5 (mouth), it is changed to 1 (face contour) at step R7) and control returns to step R2. When the second part designation key 32e has been operated, the controller decrements by one the number of the part to be changed (when the part number is 1 (face contour), it is changed to 5 (mouth) at step R7) and control returns to step R2.

When the controller 31 determines at step R6 that the answer is "NO", the controller determines whether the first and second pattern selection keys 32f and 32g of the key-in unit 32 have been operated (step R8). If the first part selection key 32f has been operated, at step R9 the controller increments by one the pattern number of a part to be changed (when the part number is 20, it is changed to 1) and control returns to step R2. When the second part selection key 32g has been operated, at step R9 the controller decrements by one the pattern number of a part to be changed (when the part number is 1, it is changed to 20) and control returns to step R2.

When the controller 31 determines at step R8 that the answer is "NO", the controller determines whether the entry key 32j of the key-in unit 32 has been operated (step R10). If so, the controller 31 enters in the montage RAM 35 the pattern number data on the respective parts which constitute the montage data stored in the synthesis RAM 36 (step R11) and ends the montage creation process at step Q1. When the CPU 31A determines that the entry key 32j has not been operated, control returns to step R4.

Thus, by initialization at step R1, the first basic montage data composed of the pattern data on all the parts indicated by No. 1 is created and displayed.

When the user operates the first basic montage selection key 32b or the second basic montage selection key 32c, first-20th basic montage data each composed of part pattern data having the same number are sequentially created and displayed. Thus, the user can select a montage which he desires from among the 20 basic montage data.

When pattern data on any particular part (for example, the contour of the face) of the displayed basic montage data is to be changed to another one, the user operates the first and second part designation keys 32d, 32e to designate a part to be changed, and then operates the first and second pattern selection keys 32f and 32g to change the pattern data on the part to any desired pattern data.

When a desired montage image (FIG. 10B) has been obtained, the user operates the entry key 32j of the key-in unit 32 and enters pattern number data on the respective parts which constitute the montage image in the montage RAM 35 (FIG. 10A).

Figure 15A:
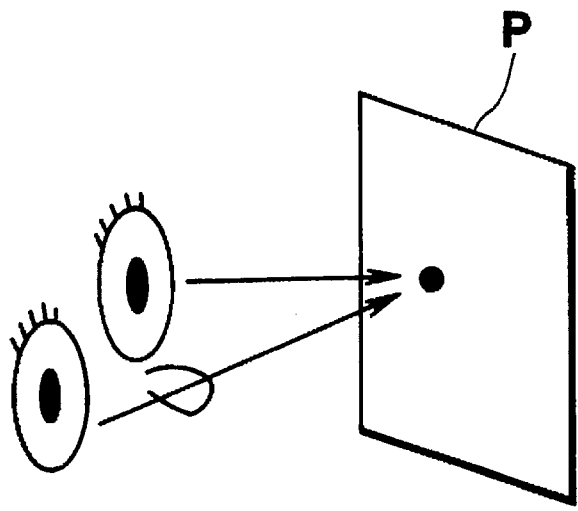
FIGS. 15A and 15B illustrate RDS.
Figure 15B:
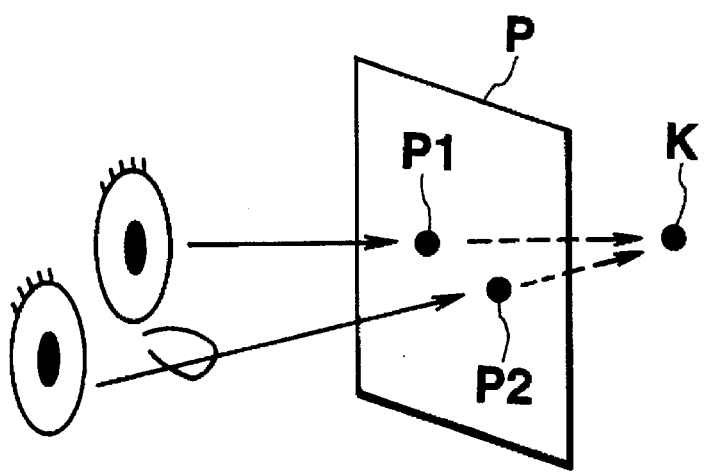

The three-dimensional image converting process performed at step Q7 of FIG. 11 will be described next with reference to FIGS. 15–17. First, the RDS used in the three-dimensional image creation process of the present embodiment will be described. When the user views a stereogram as an ordinary picture, the user's right and left eyes intersect at a point P on the plane of a paper sheet, as shown in FIG. 15A. When the user views the stereogram three-dimensionally, the user's right and left eyes view different positions P1, P2 on the plane of the paper sheet P, as shown in FIG. 15B. By changing the distance between the intersection K of the eyes and the plane of the paper sheet P, the user can view the stereogram three-dimensionally. When the distance between the intersection K of the user's right and left eyes and the plane of the paper sheet P increases or decreases, the spacing between the intersections P1 and P2 where the our right and left eyes intersect with the plane of the paper sheet decreases or increases. Therefore, by increasing or decreasing the spacing between the two points P1 and P2 on the plane of the paper sheet, the related image portion becomes three-dimensional.

Figure 16A:
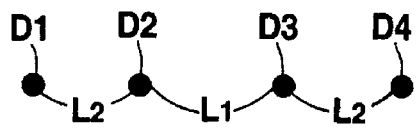
Figure 16C:

For example, when the user views four points D1–D4 of FIG. 16A three-dimensionally, those points look as five points D11–D15, as shown in FIG. 16B. Since the spacing L1 between the two central points D2 and D3 of FIG. 16A is greater than the other spacing L2 between points D1 and D2 or between D3 and D4, the central point D13 looks sunken against the other points D12 and D14, as shown in FIG. 16C.

Figure 17A:
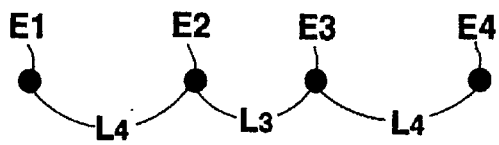
Figure 17C:

Similarly, for example, when we view four points E1–E4 of FIG. 17A three-dimensionally, those points look as five points E11–E15 of FIG. 17B. Since the spacing L3 between the two central points E2 and E3 of FIG. 17A is narrower than the other spacing L4, the central point E13 looks relieved against the other points E11, E12, E14 and E15, as shown in FIG. 17C.

That is, rugged three-dimensional expression of an image is possible in dependence on the magnitude of the spacing between two points concerned.

Figure 18:
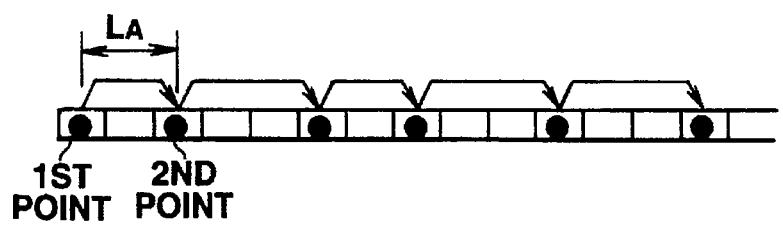
FIG. 18 illustrates RDS.

The color (in the case of a monochrome, white or black) of any particular point on one line on an image to be expressed as a three-dimensional one is determined randomly as such at a first point, the distance LA from the first point to the position of a second point is determined in dependence on the height of the first point, and the second point is expressed having the same color as the first point. As shown in FIG. 18, by repeating this operation, a three-dimensional image is created.

This operation only causes the discrete points on the image to be viewed three-dimensionally. Therefore, a similar operation is performed for other points on the same line on the image to be connected to a three-dimensional one. Some points can overlap with case, for example, for the first point, the color set previously is used as it is. For the second and other points, points having the same color as the first point are required to be drawn so as to be superposed on the points drawn previously.

When all the points on any particular line of the image to be converted to a three-dimensional image have been processed, the next line is processed.

Figure 19:
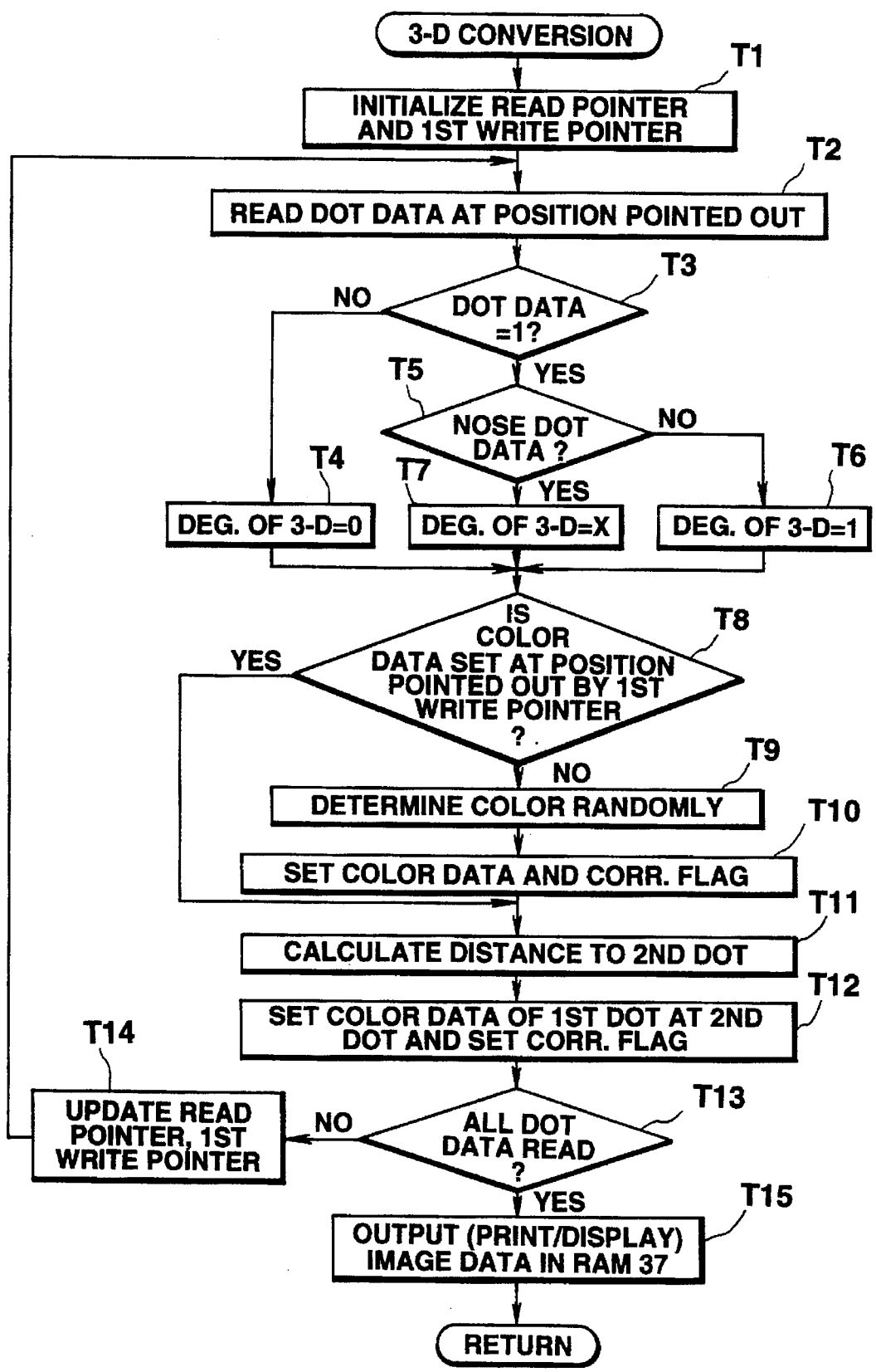
FIG. 19 is a flowchart indicative of the details of a three-dimension (3-D) conversion shown in FIG. 11.

In the present second embodiment, a montage MG formed on the synthesis RAM 36, using RDS, is converted to a three-dimensional image RG in the sequence of FIG. 19.

First, the controller 31 initializes a first write pointer which points out the position of reading dot pattern data stored in the synthesis RAM 36 and the position of writing a first dot in the three-dimensional image creation RAM 37 (step T1).

Next, the controller 31 reads dot data at the position pointed out by the read pointer in the synthesis RAM 36 (step T2).

The controller 31 then determines whether the read dot data is "1" (step T3). If it is "0", that portion of the image which that dot expresses corresponds to the background of FIG. 12, and the controller sets the degree of three dimensions at 0 (step T4).

When the read dot data is "1" at step T3, the controller 31 determines whether the dot data is for constituting a part of the nose of the montage image (step T5). The controller 31 determines whether the dot data is for constituting a part of the nose of the image, for example, in dependence on whether the position (address) of the read dot data is within an area where the pattern data on the nose is set.

If the data is not for constituting a part of the nose (or if the dot data is for constituting a part of the contour, hair style, eyes or mouth of the face), the controller 31 sets the degree of three dimensions at 1 for the dot data (step T6).

Figure 11:
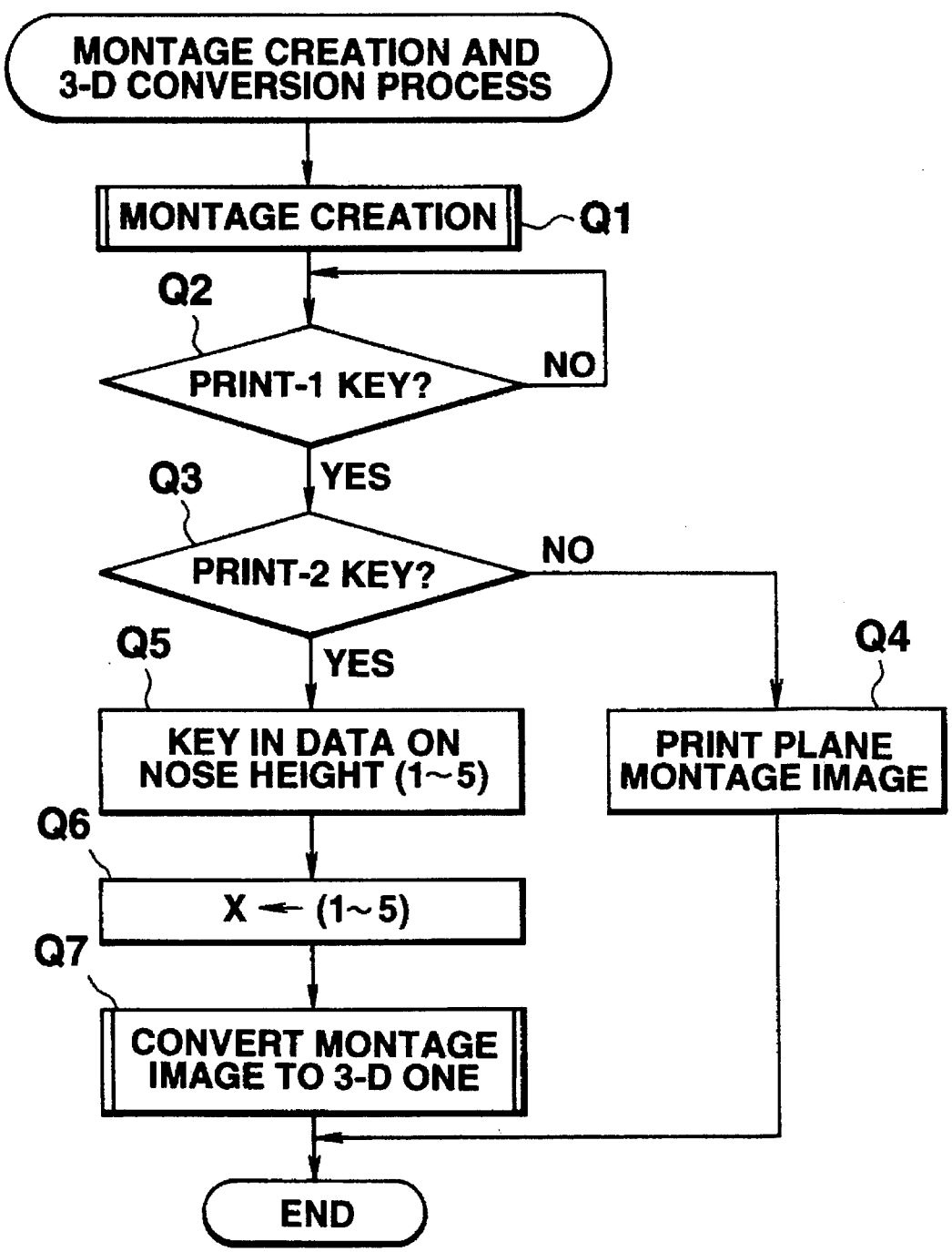
FIG. 11 is a flowchart indicative of a montage creation process and a three-dimensional image creation process by the three-dimensional image creation device of FIG. 8.

When the read dot data is "1" and for constituting a part of the nose, the controller 31 sets the degree of three dimensions at the variable X set at step Q6 of FIG. 11 (step T7).

The controller 31 then determines on the basis of the value of a flag to be described later in more detail whether a color (white or black since in the second embodiment a monochrome is handled) is set already, that is, dot data is already written, at the position pointed out by the first write pointer in the three-dimensional image creation RAM 37 (step T8). If not, the controller 31 determines a color randomly (step T9), writes the determined color at the dot designated by the first write pointer in the three-dimensional image creation RAM 37 and sets a flag indicating that the color is set at the dot (step T10).

The controller 31 then calculates the distance between the first and second dots as follows (step T11):

The distance (the number of dots) =a basic width–a degree of three dimensions ×a coefficient depending on the degree of three dimensions where the basic width is a value determined in consideration, for example, of the interval between the right and left eyes of a human being (about 66 mm) and the degree of ease of viewing a three-dimensional image, and indicates the basic value between any two adjacent dots. The degree of three dimensions is a value indicating the degree of ruggedness of any portion of the image. The coefficient depending on the degree of three dimensions indicates the number of dots changing each time the degree of three dimensions changes by one gradation. As the coefficient increases, the depth or height of the three-dimensional image changes greatly each time the degree of three dimensions changes by one gradation.

The basic width, coefficient depending on the degree of three dimensions and the degree of three dimensions can be determined freely as required. In the present embodiment, the basic width is 30 (dots), the coefficient is 2 and the degree of three dimensions is 0–5, but the present invention is not limited to those values alone.

The controller 31 calculates the position of a second write pointer indicating a second dot writing position on the basis of the distance, sets the same color data as the first dot at the position pointed out by the second write pointer, and sets a flag indicating that the color has been set (step T12).

The controller 31 then determines whether all the dot data on the image stored in the synthesis RAM 36 has been read (step T13). If not, the controller 31 updates the positions of the read pointer and the first write pointer (step T14).

When the controller 31 has completed reading all the dot data on the montage image MG formed in the synthesis RAM 36, the controller 31 outputs (displays or prints) the image data stored in the three-dimensional image creation RAM 37 or the finished three-dimensional image data (step T15).

FIGS. 20 and 21 show a montage image MG of FIG. 10B and a three-dimensional image RG formed on the basis of the montage image MG in the above described method, respectively.

As described above, according to the second embodiment, the controller 31 combines a plurality of beforehand prepared part pattern data freely to create a plane montage image MG and converts the image MG to a three-dimensional image, using RDS, and outputs (prints or displays) the three-dimensional image.

While in the second embodiment the nose of a face has been illustrated as relieved against other parts, the present invention is not limited to it. For example, the user can input data on the height of eye pattern data to express sunken eyes three-dimensionally.

Figures 22, 23:
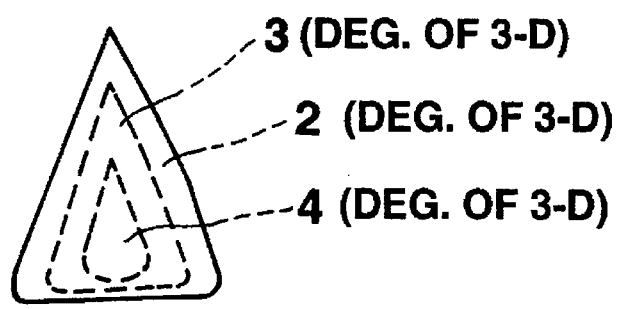
FIG. 22 illustrates an example of information indicative of a degree of three dimensions added to each of patterns.
FIG. 23 illustrates an example of information indicative of degrees of three dimensions added to the whole pattern.

As shown in FIG. 22, a nose height may be set beforehand for each of the noses patterns, data on which is stored in the basic part pattern ROM 33, and the nose pattern may be converted to a three-dimensional nose image with a degree of three dimensions set in the selected pattern data. In this case, steps Q5 and Q6 of FIG. 11 are not required to be provided. At step T7 of FIG. 19 the degree of three dimensions used is that set in the selected pattern.

A part to be expressed three-dimensionally may be selected. In this case, the user sets data on a part to be converted to a three-dimensional one and data on its degree of three dimensions at step Q5 of FIG. 11, and enters the set data at step Q6. At step T5 of FIG. 19 the controller 31 determines whether the read dot data is pattern data to be converted to the three-dimensional image. If so, at step T7 the controller 31 sets the degree of three dimensions at the value input by the user to thereby express any part pattern with any degree of three dimensions.

As in FIG. 23, information on a height may be set all over a part. For example, a nose can be expressed so as to be rugged like a real nose, a check can be a little partially relieved or a rugged hair style can be expressed three-dimensionally. In this case, the controller 31 determines which portion of each part dot data belongs to (at step T5 of FIG. 19) and converts the dot to a three-dimensional one with a degree of three dimensions set at the determined portion of the part (sets two points which define the distance depending on the degree of three dimensions).

While in the second embodiment the creation of a montage image MG of a human face and the conversion of the montage image to a three-dimensional image have been described and illustrated, any parts or any image can be created freely and applicable as required. For example, a neck, shoulders, and a pair of glasses can be added as parts which constitute a portion of a montage image or data on the part patterns of a car may be prepared beforehand and a created car image may be converted to a three-dimensional one.

Figure 24:
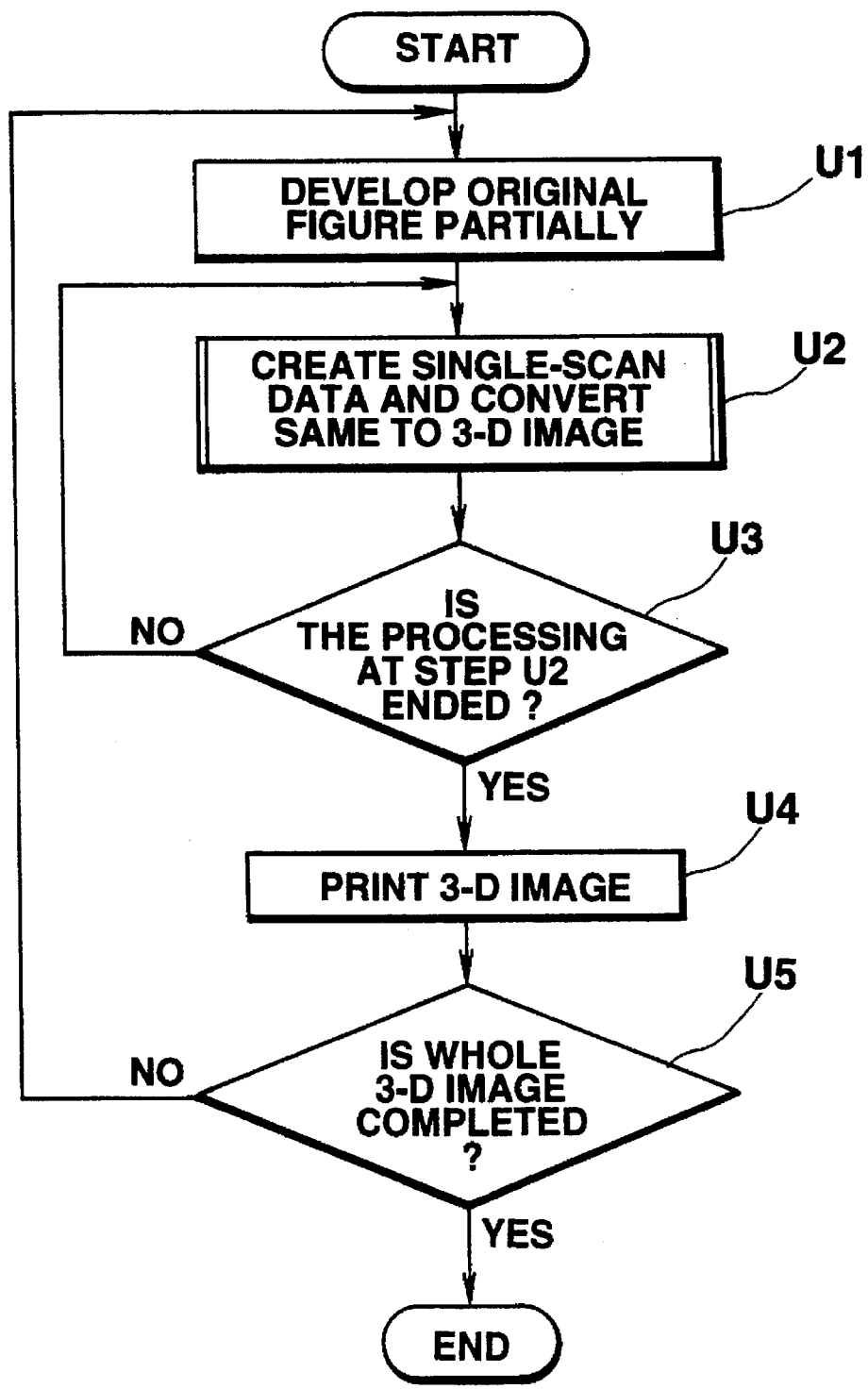
FIG. 24 is a flowchart indicative of a modification of the three-dimensional image creation process.

When the capacities of the synthesis RAM 36 and the three-dimensional image creation RAM 37 are limited, all the montage data and its three-dimensional image data are not required to be created at a time, but those data may be created partially and printed, and similar operations may be repeated for the remaining other parts to thereby print a complete three-dimensional image finally. For example, as shown in FIG. 24, the montage image may be developed by an amount of data printed by a single movement (or by a single main scan) of the printing head of the printer 29 across the recording paper (step U1), converts the printed data by one (dot) line at a time to a three-dimensional image (steps U2, U3), prints the three-dimensional image data for the single main scan (step U4), and iterates similar operations until a three-dimensional image for all the image data is completed (step U5) to thereby convert any image to a three-dimensional image, using a memory having a small capacity.

In the present embodiment, a three-dimensional image creation process performed when a stereogram is viewed, using a process for viewing different portions of an image simultaneously with the user's right and left eyes which are substantially parallel (a parallel eye process) has been described and illustrated. In contrast, when a stereogram is viewed, using a process for viewing different portions of an image simultaneously by causing the user's right and left eyes to intersect once with each other at a nearby position (an intersecting eye process), the resulting feeling of three dimensions is inverse to that in the parallel eye process (FIGS. 16, 17). That is, the portions of an image which appear to be relieved and sunken against the background in the parallel eye process, appear to be sunken and relieved, respectively, against the background in the intersecting eye process. Thus, in order to perform three-dimensional conversion to view a stereogram using the intersecting eye process, the distance between the first and second dots at step T11 of FIG. 19 is calculated, for example, as follows:

The distance (the number of dots) =a basic width+a degree of three dimensions ×a coefficient depending on that degree of three dimensions.

A third embodiment of the present invention will be described next, which takes the form of an electronic notebook having the functions of storing individual's data and montage data to which the three-dimensional image creation device as the second embodiment of the present invention is applied. The same reference numerals are used to identify the same elements in the third and second embodiments.

Figure 25:
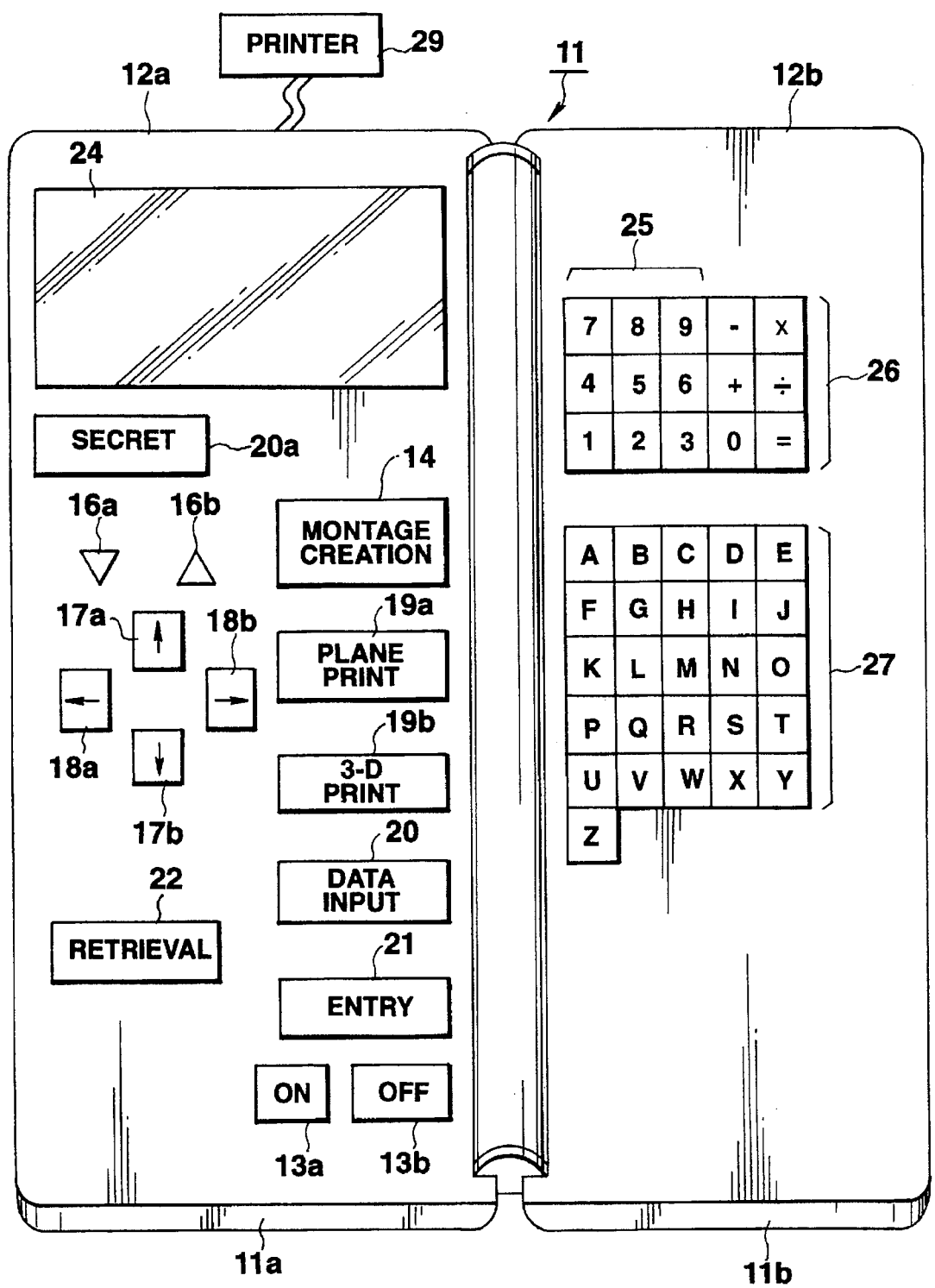
FIG. 25 shows the appearance of an electronic notebook as a third embodiment of the present invention.

As shown in FIG. 25, the electronic notebook has a case 11 which includes a pair of right and left case halves 11a, 11b openable right and left. The right case half 11a has on an operating surface 12a thereof an "ON" key 13a and an "OFF" key 13b which are used to turn on and off a power supply; a montage creation key 14 which is operated to set a montage creation mode; first and second basic montage selection keys 16a and 16b to select basic montage data composed of combined pattern data having the same number from among the respective beforehand stored part pattern data; first and second part designation keys 17a and 17b used to designate a part to be changed in the montage creation; first and second pattern selection keys 18a and 18b used to select pattern data on a part designated as being changed; a plane image print key 19a operated when the created or entered montage data is printed as a regular plane image; a three-dimensional image print key 19b operated when the created or entered montage data is printed as a three-dimensional image; a data input key 20 operated when an input mode to input individual's data, etc., is set; an entry key 21 operated when the montage data, individual data, etc., created and input in the montage creation mode and in the data inputting mode are stored/entered, respectively; and a retrieval key 22 operated when a data retrieval mode is set.

The left case half 11a has on an operating face 12a thereof a liquid crystal dot matrix display 24. A printer 29 is connected to the case 11 through a connector and a cable (none of which are not shown). The right case half 11b has on an operating face 12b a ten-key ("0–9") unit 25 operated when a numerical value is keyed in; an arithmetic ("+, −, ×, ÷, =") key unit 26; and an alphabetical key ("A"–"Z") unit 27 to key in data.

Figure 26:
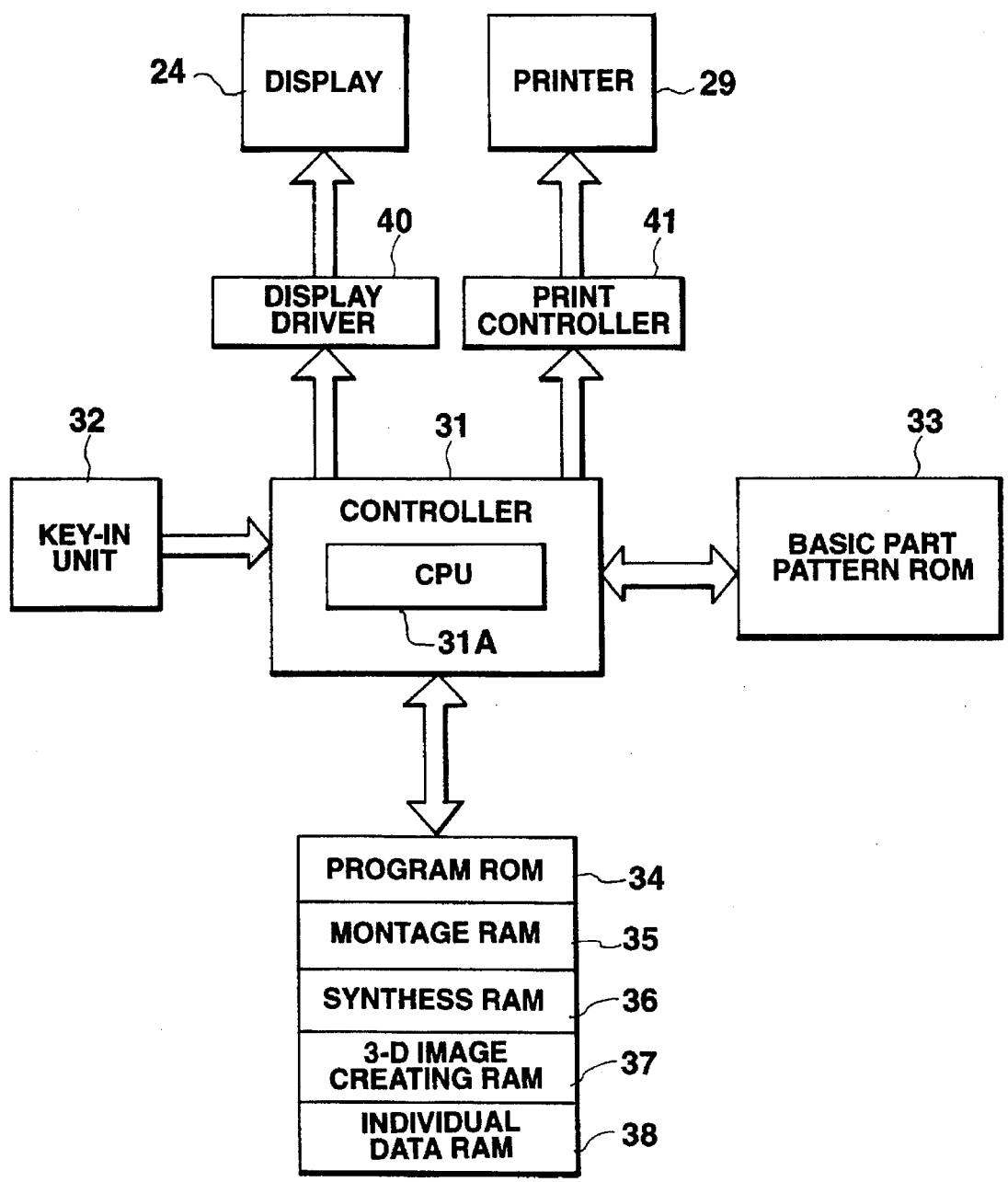
FIG. 26 is a circuit block diagram of the electronic notebook of FIG. 25.

FIG. 26 shows the structure of the circuit of the electronic notebook of FIG. 25. This circuit structure is substantially the same as the second embodiment of FIG. 8 except that the former has an individual data RAM 38.

As shown in FIG. 27, the individual data RAM 38 has a capacity for storing, for example, 50 individual data each including an individual name, address, telephone number, etc., pattern number data on the parts which constitute the montage image of that individual, and a secret flag.

Figure 28:
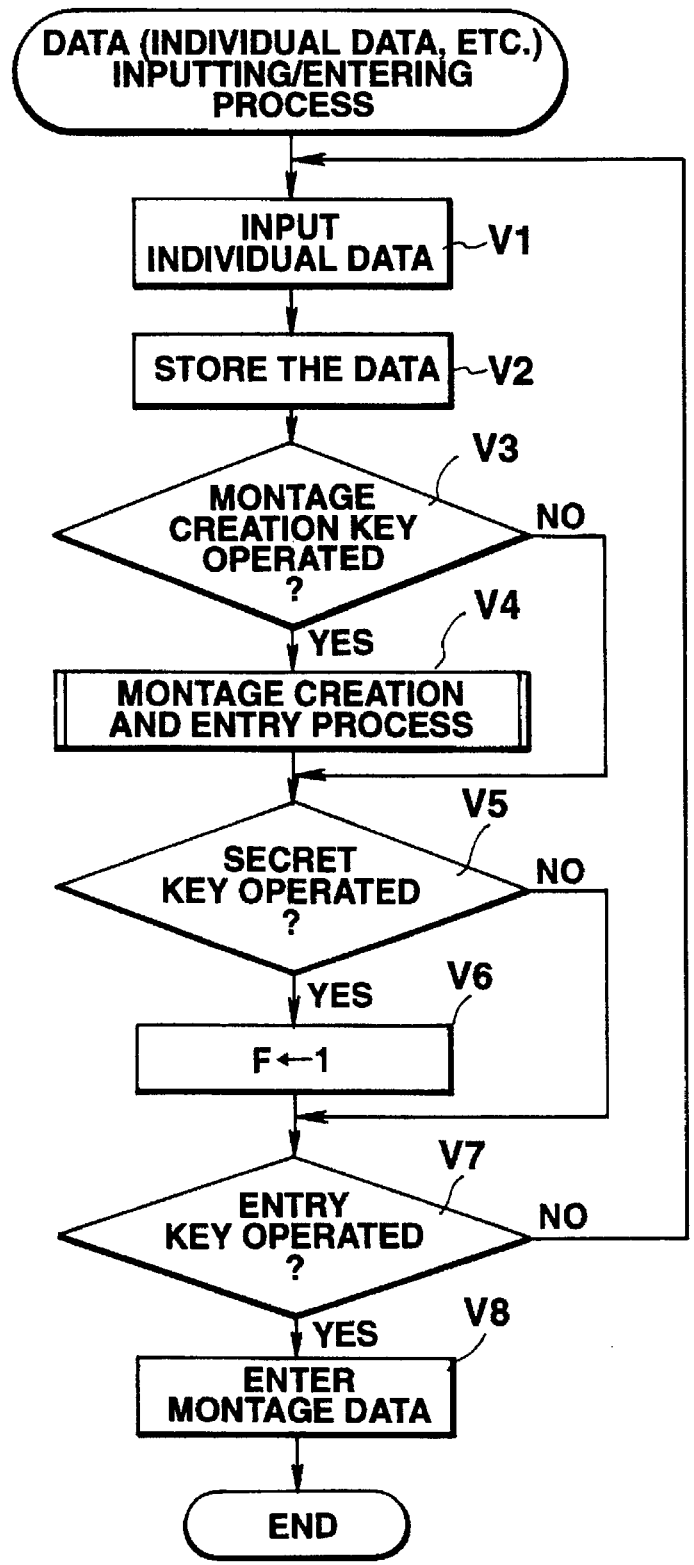
FIG. 28 is a flowchart indicative of the structure of inputting/entering data to/in the electronic notebook of FIG. 25.

The operation of the electronic notebook of this embodiment will be described next. FIG. 28 is a flowchart indicative of a data inputting/entering process performed by the electronic notebook.

When individual data and his montage data are entered in the individual data RAM 38, the user operates the data input key 20. In response to this operation, the controller 31 starts the processing of FIG. 28.

When the respective key units 25, 26 and 27 are operated to input individual data on his name, address, telephone number and birth date, the data is stored in the individual data area of the individual data RAM 38 (steps V1, V2).

The controller 31 then creates montage data corresponding to the just stored individual data just stored in the individual data RAM 38 in a montage creation process similar to that in the second embodiment and enters it in the montage RAM 35 (steps V3, VC4).

When this montage data created at step V3 is desired to be kept secret from others except for the user, the user operates a secret key 20a, which sets a secret flag F in a secret flag area provided in correspondence to the storage area for the montage data (steps V5, V6).

When the entry key 21 is then operated, the controller transfers and enters the montage data (pattern number data on the respective parts) stored in the montage RAM 34 to and in the montage area of the individual data RAM 38 (steps V7, V8).

That is, the desired individual data, montage data and secret flag F data are stored in the individual RAM 38.

Figure 29:
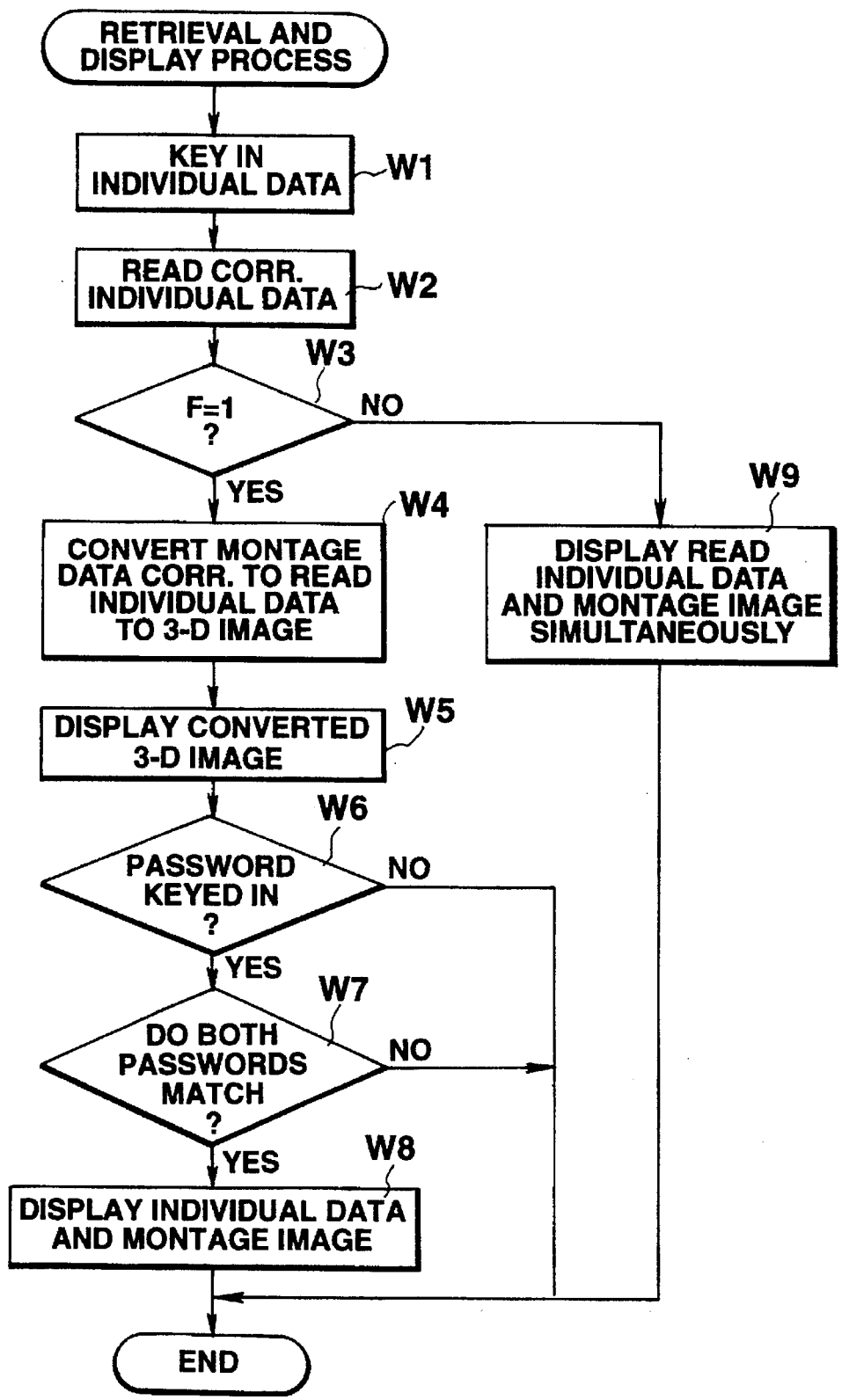
FIG. 29 is a flowchart indicative of retrieval of the electronic notebook of FIG. 25.

FIG. 29 is a flowchart indicative of retrieval and display of the individual data entered in the electronic notebook.

When the retrieval key 22 is operated to retrieve desired individual data entered in the individual data RAM 38, the controller 31 is set in a data retrieval mode to start the processing of FIG. 29.

First, the user keys in his name, telephone number, etc., using the alphabetic key unit 27 and the ten-key unit 25 (step W1). In response to this operation, the controller 31 reads from the individual data RAM 38 individual data corresponding to the keyed-in data (step W2).

When the secret flag F annexed to the read individual data is set, the controller 31 converts the montage data corresponding to the individual data to three-dimensional image data in the montage creation process and the three-dimensional image converting process, and displays the converted three-dimensional image data on the display 24, as shown in FIG. 21 (steps W3–W5).

When the controller 31 retrieves the individual data for which the secret flag F is set, the controller 31 displays the corresponding montage as a three-dimensional image which cannot be recognized at a glance.

When the ten-key unit 25 is operated to key in a password for the three-dimensional image, the controller 31 compares a password entered beforehand and the keyed-in password (steps W6, W7). If the beforehand entered password matches with the keyed-in one, the controller 31 displays a regular montage image MG formed on the synthesis RAM 36 on the display 24, as shown in FIG. 20. At this time, the controller 31 also displays the "name, address and telephone number" as the read individual data (step W8).

When a secret flag F annexed to the read individual data has been reset, the controller 31 creates a corresponding montage image MG and displays same along with the read individual data on the display 24 (steps W3, W9).

According to the present embodiment, when the secret flag F has been set, the controller 31 displays the three-dimensional image of that montage on the display 24. Since the three-dimensional image cannot be recognized at a glance, the montage image displayed as the three-dimensional image RG is kept secret from the third party.

If the three-dimensional image print key 19b is operated with the three-dimensional image being displayed on the display 24, the printer 29 prints the three-dimensional image.

By a key-in operation similar to that performed in the second embodiment, any montage data different from the individual data may be created and converted to a three-dimensional image.

While in the third embodiment the application of the three-dimensional image creation device of the second embodiment to the electronic device having the function of entering individual data and montage data has been illustrated, the present invention is not restricted to that function. The present invention is applicable to various electronic devices such as word processors, personal computers or label printers which combine a plurality of beforehand entered patterns to any image and output same.

While in the second and third embodiments a plane image is converted to a three-dimensional image, using RDS, a plane image may be converted to a three-dimensional image, using other techniques.

The process for creating and printing a three-dimensional image, using a memory whose storage capacity for storing three-dimensional image data is small, which has been described with reference to FIG. 24 of the second embodiment, will be described in more detail below.

Figure 30:
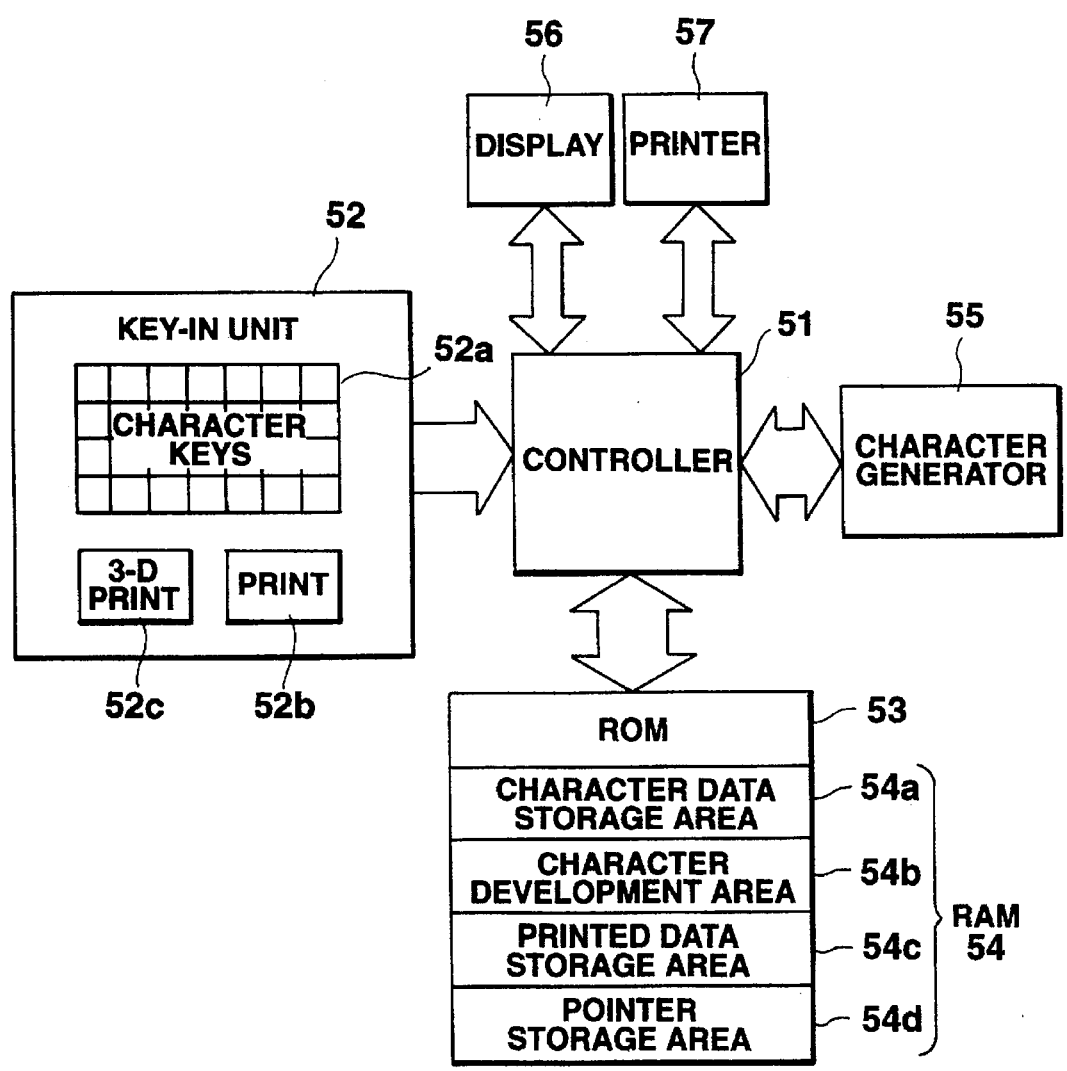
FIG. 30 is a block diagram of a three-dimensional image creation device as a fourth embodiment of the present invention.

A three-dimensional image creation device as a fourth embodiment of the present invention to be next described has a small memory capacity for storing three-dimensional image data. FIG. 30 is a block diagram of the circuit of the three-dimensional image creation device as the fourth embodiment, which includes a controller 51, a key-in unit 52, a ROM 53, a RAM 54, a character generator 55, a display 56, and a printer 57, each of which is connected to the controller 51.

Figure 35:
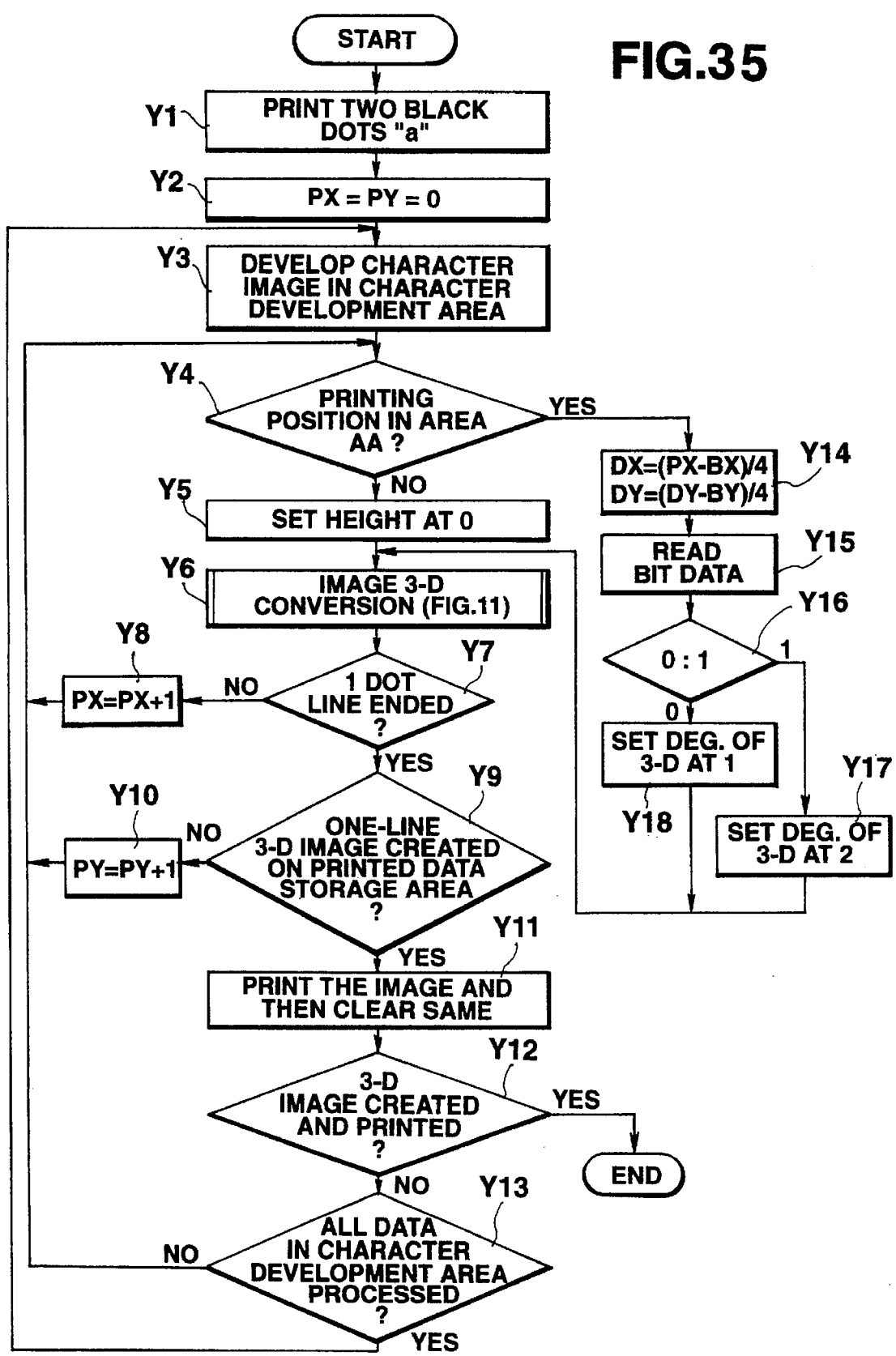
FIG. 35 is a flowchart indicative of a three-dimensional image creation process performed by the three-dimensional image creation device of FIG. 30.
Figure 36:
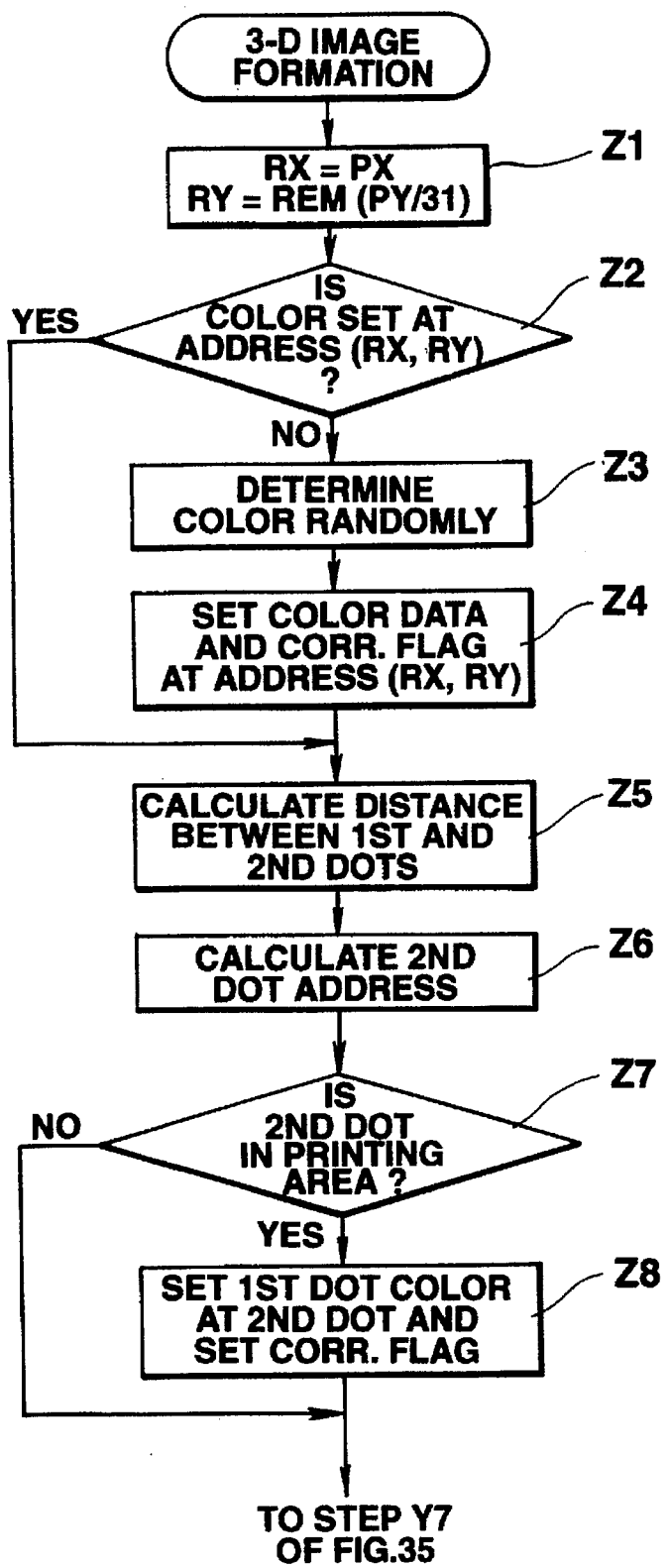
FIG. 36 is a flowchart indicative of a three-dimensional image creation process performed by the three-dimensional image creation device of FIG. 30.

The controller 51 is composed of a CPU (not shown) and its peripheral circuits (not shown), controls the respective elements of the device and performs a control program shown in the flowchart of FIGS. 35 and 36.

The key-in unit 52 includes various keys such as character keys 52a, a printing key 52b and a three-dimensional image print key 52c.

The ROM 53 stores control programs of FIGS. 35 and 36.

The character generator 55 generates a character pattern of input character data.

The display 56 is composed of a liquid crystal display element and a display control circuit and displays characters, figures, etc., under the control of the controller 51.

The printer 57 is composed of a thermal dot printer and a paper feed mechanism like the printers of the first and second embodiments, and prints a created document, etc., under the control of the controller 51. The thermal dot printer includes a 31-dot heater extending in the sub-scan direction (of extension of recording paper) to thereby print a 31-dot image by a single scan in the main scan direction (across the recording paper). In the description, that portion of an image printed by a single scan in the main scanning direction is referred to as one (printing) line, which has a width of 31 dots.

The printer 57 carries the printing paper by a length of 31 dots in the sub-scan direction each time one line is printed.

The RAM 54 includes an input character data storage area 54a, a character development area 54b, a printed data storage area 54c, and a pointer storage area 54d which stores various pointers.

The character data storage area 54a stores input character data (numerals, pictorial and foreign characters, figures, etc.) in the form of a code. The character development area 54b stores, in the form of a bit map, one line of character data (numerals, pictorial and foreign characters, figures, etc.) stored in the character data storage area 54a.

The printed storage area 54c stores bit map data for a single main scan of the printer 57, and is a so-called line buffer which has a very small capacity compared to a page buffer of a page printer. While the printed data storage area 54c is shown in FIG. 30 as being included in the RAM 54, it may be provided in the printer 57.

The pointers in the present embodiment are pointers PX, PY which point out the address of a printing position; pointers DX, DY which point out a read address in the character development area 54b; and pointers RX, RY which point out a write address in the printed data storage area 54c.

The operation of the three-dimensional image printing device of the fourth embodiment will be described next. In the fourth embodiment, any document data may be input or previously stored document data may be read and printed in an ordinary manner. In addition, such document data may be converted to three-dimensional image data and printed three-dimensionally.

In the present embodiment, the basic size of a one-character dot pattern is 31 dots long×32 dots broad. When a character pattern of this size as it is is converted to a three-dimensional image, the respective characters are small and difficult to recognize three-dimensionally. To avoid this situation, in the present embodiment, when three-dimensional image printing is instructed, the characters are forced to be enlarged 4 times horizontally and vertically, and the enlarged characters are then converted to corresponding three-dimensional images.

Therefore, when a document to be printed three-dimensionally has a B-5 size and is put so as to extend vertically, it should be printed with five characters per line as an upper limit and with the respective character patterns taking the form of a three-dimensional image and constituting an arrangement of FIG. 31.

In FIG. 31, an area AA has a degree of three dimensions of 0; hatched areas B1 and B2 are the ones where the three-dimensional images of character patterns are developed with three-dimensional image data for one character being developed in each of the solid line frames B11–B15 and B21–B25. The areas other than the respective frames B11–B15 and B21–B25 in the areas B1 and B2 should have a degree of three dimensions of 1; and the areas of the respective frames B11–B15 and B21–B25 of the areas B1 and B2 where the characters are to be printed should have a degree of three dimensions of 2.

By doing so, a background area AA having the degree of three dimensions of 0 is situated in the peripheral area, the areas B1 and B2 are positioned which are relieved with a degree of three dimensions of 1 in units of a line in the background area AA, and characters are printed which are relieved with a degree of three dimensions of 2 in the frames B11–B15 and B21–B25 of the areas B1 and B2.

When an A4-sized sheet of printing paper is put extending vertically, character patterns are converted to corresponding three-dimensional images, which are then printed in an arrangement corresponding to the paper size with six characters per line as an upper limit.

In the fourth embodiment, foreign and pictorial characters are 24×24 dots in dimensions. If character data of this size as it is is converted to a three-dimensional image data, this data is difficult to recognize three-dimensioally because the characters are small. In order to avoid this situation, in the present embodiment, when three-dimensional printing is instructed, the respective characters are forced to be enlarged 16 times horizontally and vertically and the enlarged characters are then converted to corresponding three-dimensional images. Therefore, the number of foreign characters to be printed three-dimensionally should be one per line and those characters should be printed on a B5 sized sheet of paper in an arrangement shown in FIG. 34.

In this case, display is made such that the background area AA having a degree of three dimensions of 0 is situated at the center of the printing paper, an area BA relieved with a degree of three dimensions of 1 is situated in the area AA, and foreign and pictorial characters are relieved with a degree of three dimensions of 2 in the area BA.

The process and operation for creating and printing a three-dimensional image will be described with reference to the flowcharts of FIGS. 35 and 36.

First, the user uses the character key unit 52a to key-in/edit characters. The keyed-in/edited character data is stored in the form of a code in the character data storage area 54a. The controller 51 uses the character generator 55 to convert the keyed-in/edited character data to a dot pattern and displays the dot pattern on the display 56. The keying-in/editing operations are the same as those performed in the conventional device.

As shown in FIG. 33, assume that the user has keyed in "ABCDE", "New paragraph", and "FGHIJ" and then has operated the three-dimensional image print key 52c.

In this case, the printer prints two black dots "a" which instruct the user's direction of view at step Y1 of FIG. 35.

The controller 51 sets an initial value "0" in the pointers PX, PY stored in the pointer storage area 54d (step Y2). The pointers PX, PY point out the X, Y coordinates of any point in an area to be printed in a sheet of printing paper when the left upper point of the area to be printed is handled as an original point.

The controller 51 reads from the character generator 55 data on character images of a dot pattern corresponding to the character data stored in the form of a code in the character data storage area 54a, and develops and stores the original figure (character pattern) of the character portion of the character image data to be converted to a three-dimensional image in the character development area 54b (step Y3).

In the case of the example of FIG. 33, since the character string "ABCDE" is in the first row, the controller 51 accesses the character generator 55 and writes into the character development area 54b the bit map patterns of the respective characters of the character string "ABCDE" where a black dot and a white one are handled as "1" and "0", respectively, in the arrangement of FIG. 32.

The controller 51 determines which area of the printing paper the position pointed out by the pointers PX, PY belongs to, that is, which of the background area AA and the character development areas B1, B2 the position belongs to (step Y4). If the position belongs to the area AA, control passes to step Y5 whereas when the position belongs to the area B1 or B2, control passes to step Y14.

Initially, PX=PY=0 and the position pointed out by the pointers PX, PY belongs to the area AA. Thus, control passes to step Y5, where the controller sets at 0 the degree of three dimensions of the point pointed out by the pointers PX, PY. Thereafter, control passes to step Y6, where the controller uses the RDS to convert the point to a three-dimensional image and sets the two points (corresponding to the points P1, P2 of FIG. 15(B)) in the printed area storage area 54c. The specified processing at step Y6 will be described later.

The controller 51 then determines whether processing for one dot line has ended or the value of the pointer PX has reached 959 (step Y7). If not, control passes to step Y8 whereas if so at step Y7, control passes to step Y9.

In the case of this example, since the processing for one dot line has not ended, control passes to step Y8, where the controller 51 increments the value of the pointer PX by one and control returns to Y4.

When the above processing is performed 960 times, a three-dimensional image dot pattern expressing a background having a degree of three dimensions of 0 is obtained on the first dot line of the printed data storage area 54c. At this time, the pointer PX has a value of 959. Thus, the controller 51 determines that the answer at step Y7 is "YES". Control then passes to step Y9, where the controller 51 determines whether writing the bit map data into printed data storage area 54c has been completed. If not, control passes to step Y10, whereas if YES at step Y9, control passes to step Y11.

In this example, since bit map data for the 0th dot line has been only written into the printed data storage area 54c, the controller 51 determines "NO". Thus, control passes to step Y10, where the controller increments the value of the pointer Y by one and control returns to step Y4. Thereafter, the controller 51 performs similar operations on the first-31th dot lines to thereby form three-dimensional images for the first-30th dot lines, i.e., for a first line, in the printed data storage data area 54c.

At this time, at step Y9 the controller 51 determines that writing the three-dimensional image bit map patterns into the printed data storage area 54c has been completed. Thus, control passes to step Y11, where the controller 51 reads the bit map data stored in the printed data storage area 54c sequentially 31 bits at a time in the sub-scan direction, transfers the data to the printer 57 and causes same to print the data.

When printing for one line (31 dot lines) has ended, at step Y12 the controller 51 determines whether the printing has ended. If so, the controller 51 ends the printing process. If not, control passes to step Y13.

In the present example, since printing of a three-dimensional image for one line has only been completed, the controller 51 determines "NO". Thus, control passes to step Y13, where the controller 51 determines whether the formation of a three-dimensional image of the character string stored in the character development area 54b has ended. If so, control returns to step Y3, where the controller 51 develops in the character development area 54b pattern data of a character string in a line next to that stored in the character data storage area 54a. If not at step Y13, control returns to step Y4.

In the present example, since the formation of the three-dimensional image of the character strings stored in the character development area 54b has not been completed, control returns to step Y4.

Thereafter, similarly, the controller 51 develops in the printed data storage area 17C a bit map pattern of a three-dimensional image having a degree of three dimensions of 0 for a second line (31th–61th dot lines), a third line (62th–92th dot lines) and a fourth line (93th–123th dot lines) of the area AA of the three-dimensional image of FIG. 31 and performs a printing operation of the developed bit map pattern in units of a line.

When the controller 51 ends the above operations, the controller 51 starts the processing of a fifth line (124th dot line). In this case, since the position pointed out by the pointers PX, PY is in the area AA in the range of 0–95 of the pointer PX, the controller 51 performs the same processing as that mentioned above. When the value of the pointer PX is 96, the position pointed out by the pointers PX, PY is in the area B1. Therefore, after the determination at step Y4, control passes to step Y14, where the controller 51 calculates the read address DX, DY of the character development area 54b by omitting a decimal fracture of the quotient, as follows:

$$DX=(PX-BX1)/4$$

$$DY=(PY-BY1)/4$$

where BX and BY1 are reference point addresses in the X and Y directions, respectively, in the area B1.

The controller 51 reads bit data at the storage position in the character development area 17B pointed out by the calculated address DX and DY (step Y15). If the read bit data is "1"(black), the controller sets the degree of three dimensions at "2" (steps Y16, Y17) whereas if the read bit data is "0"(white), the controller 51 sets the degree of three dimensions at "1" (steps Y16, Y18).

Control then passes to step Y6, where the controller 51 converts a dot at the position pointed out by the pointers PX and PY to a three-dimensional image on the basis of the degree of three dimensions set at step Y17 or Y18.

Thereafter, control passes through steps Y7, Y8 and Y4 again to step Y14. At step Y8 the pointer PX is incremented by one whereas at step Y14 the value of the pointer PX is reduced to ¼ (shifted by two bits toward the LSB), so that canceling occurs, and hence the addresses DX and DY of the character development area 54b have the same value as those in the last processing. Therefore, the controller 51 reads the same bit data as the last one from the character development area 54b, and converts the next dot on the same dot line to a three-dimensional image with the same degree of three dimensions as that in the last processing. Thereafter, the controller 51 iterates similar processing twice. In such processing, the controller 51 simultaneously performs a process for enlarging the respective dots quadruply in the character development area 54b in the X direction and a process for converting the respective enlarged dots into three-dimensional images.

When the controller 51 performs the above processing four times on the same dot in the character development area 54b, it updates the address DX calculated at step Y14, starts the processing for the next dot in the same dot line, and thereafter iterates similar processing.

When the controller 51 ends the processing for one dot line, it increments the pointer PY by one at step Y10. Control then returns to step Y4, where the controller 51 iterates operations similar to those performed above. When the position pointed out by the pointers PX and PY is in the area B1, the controller 51 performs processing at steps Y14–Y18. Since at step Y14 the controller 51 has already calculated ¼ of the address, the read address DY in the Y direction in the character development area 54b takes the same value as that in the last processing. As just described above, the controller 51 reads data on the same dot line in the character development area 54b until the value of the pointer PY is updated four times, and creates a three-dimensional image on the basis of the read values. In this processing, the controller 51 simultaneously performs a process for enlarging the respective dots in the character development area 54b quadruply in the Y direction and a process for converting the enlarged dots to a three-dimensional image.

When the controller 51 iterates similar operations sequentially until a three-dimensional image for the 0th–7th dot lines in the character development area 54b is formed in the printed data storage area 54c, the controller 51 determines at step Y9 that the formation of a three-dimensional image for one line has been completed, and prints the data in the printed data storage area 54c at step Y11.

Then, control returns through steps Y12, Y13 to step Y4, where the controller 51 sequentially performs the quadruple enlargement of the respective bit data, in the Y direction, of the 8th–15th, 16th–23th, and 24th–30th dot lines in the character development area 54b, and conversion of the respective enlarged bit data to three-dimensional images and printing of the converted bit data.

When printing of the respective three-dimensional images for the 24th–30th dot lines in the character development area 54b ends, control passes through steps Y12 to Y13, where the controller 51 determines that the processing of data stored in the character development area 54b has ended, that is, that the creation and printing of the three-dimensional image of "ABCDE" have been completed. Thus, control returns to step Y3.

That is, the controller 51 four times iterates the operations including formation of enlarged three-dimensional image data on the bit map pattern stored in the character development area 54b and corresponding to the capacity (one printing line) of the printed data storage area 54c, and printing the image data to finally obtain three-dimensional image data on the enlarged image of the pattern stored in the character development area 54b.

At step Y3 the controller 51 develops in the character development area 54b bit map data on a character string "FGIJK" of a second line in the character data storage area 54a.

Thereafter, the controller 51 performs the formation and printing of a three-dimensional image with a degree of three dimensions of 0 for a two-line portion of the area AA between the areas B1 and B2.

Thereafter, also, for the area B2, the controller 51 performs processing similar to that performed for the area B1. It is to be noted that calculation of address DY at step Y14 is performed as follows:

$$DY=(PY-BY2)/4.$$

When the processing for the area B2 ends, the controller 51 again performs the formation and printing of a three-dimensional image for a 3-line portion of the area AA. When the controller 51 completes those operations, it determines at step Y12 that the printing has ended, and hence ends the three-dimensional image printing process.

The formation of the three-dimensional image performed at step Y6 of FIG. 35 will be described in more detail with reference to FIG. 36.

First, the controller 51 calculates addresses RX and RY of the write position in the printed data storage area 54c as follows (step Z1):

$$RX=PX$$

$$RY=REM(PY/31)$$

where REM is the remainder of the quotient of the division (RY/31).

The controller 51 then determines from the value of a flag to be described later whether a color (in the present embodiment, white or black because the monochrome is used) has been already set, that is, dot data has already been written, at the position pointed out by the addresses RX, RY in the printed data storage area 54c (step Z2).

If not, the controller 51 randomly determines the color to be set (step Z3), writes bit data corresponding to the determined color at the position determined by the addresses RX and RY in the printed data storage area 54c, and sets a flag indicating that the color has been set at the dot (step Z4).

When the controller 51 determines that the color has been set at step Z2, and has set the color at step Z4, control passes to step Z5, where the controller 51 then determines the distance between the first and second dots as follows:

The distance (the number of dots) =a basic width–a degree of three dimensions ×a coefficient depending on the degree of three dimensions where the basic width is determined in consideration, for example, of the spacing between the right and left eyes of a human being (about 66 mm) and the degree of ease of viewing a three-dimensional image and indicates the basic value of the distance between the first and second dots. The degree of three dimensions is a value indicating the degree of ruggedness of any portion of the image, and a value set at steps Y5, Y17, Y18 of FIG. 35. The distance between the first and second dots decreases as the degree of three dimensions increases, as described and illustrated with reference to FIGS. 15A and 15B in the second embodiment. As the coefficient changes greatly, the depth or relief of the three-dimensional image increases each time the degree of three dimensions changes by one gradation. The coefficient depending on the degree of three dimensions indicates the number of dots changing each time the degree of three dimensions changes by one gradation.

The basic width, the degree of three dimensions and the coefficient depending on the degree of three dimensions each can be determined as any respective value. In the present embodiment, for example, the basic width is about 240 (dots), and the coefficient depending on the degree of three dimensions is 10, but the present invention is not limited to those values alone.

The controller 51 calculates a second dot address on the basis of the calculated distance (step Z6). The controller 51 then determines whether the calculated address is beyond the printing range (step Z7). If not, the controller 51 sets the same color data as the first dot at the position of the calculated address and sets a flag indicating that the color has been set (step Z8). Thereafter, control passes to step Y7 of FIG. 35. In this way, by printing two dots at a spacing depending on the degree of three dimensions, three-dimensional images of characters "ABCDE" and "FGHIJ" are printed in the first and second lines, respectively.

Figure 34:
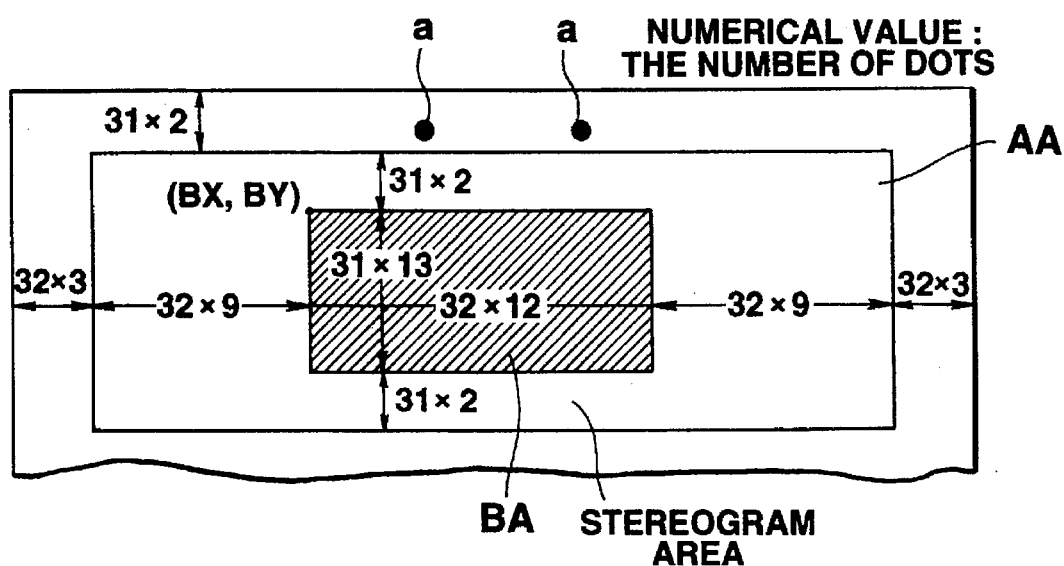
FIG. 34 illustrates one example of a printing form of a three-dimensional image of a foreign character or a pictorial symbol.

In the process involving the conversion of foreign or pictorial characters to three-dimensional images of FIG. 34 and printing of them, enlargement of those characters and formation of their three-dimensional images are performed in substantially the same process as the flowcharts of FIGS. 35 and 36 except that the calculation of an address in the character development memory at step Y14 of FIG. 35 is modified as follows:

$$DX=(PX-BX)/16$$

$$DY=(PY-BX)/16.$$

As described above, according to this embodiment, a document of any size can be converted to a three-dimensional image and then printed with the aid of the character development area 54b which has a capacity for one line of character data at most and the printed data storage area (line buffer) 54c for a single printing line (=a 32-dot line) at most. That is, a three-dimensional image of any size can be created and printed with the aid of a memory of a small capacity.

In the above embodiment, for the background of the three-dimensional image, for example, the area AA of FIG. 31, the controller 51 directly forms a dot pattern of a three-dimensional image in the printed data storage area without development of the dot pattern of the background in the character development area 54b. Therefore, the development time is reduced and the three-dimensional image is created in a reduced time.

If in the fourth embodiment the degree of three dimensions of the white dots in the areas B1, B2 and BA is 0 as in the area AA, a three-dimensional image is obtained which has the impression that the characters are relieved against the background having a degree of three dimensions of 0.

If the degree of three dimensions of the background is higher than that of the characters, a three-dimensional image is created giving the impression that the characters have sunken against the background.

When three-dimensional printing is instructed in the fourth embodiment, the respective regular characters are enlarged automatically 4 times horizontally and vertically and the respective foreign and pictorial characters are enlarged automatically 16 times horizontally and vertically. Therefore, a clearly visible three-dimensional image is created automatically. Alternatively, regular and pictorial characters may be converted and printed as a three-dimensional image without being enlarged. Alternatively, they may be enlarged 2 or 3 times horizontally and vertically and then created as a three-dimensional image.

The fourth embodiment handled the case in which the user views a stereogram, using a method for viewing different portions of an image simultaneously with user's substantially parallel right and left eyes (the parallel eye method). When the user views a stereogram, using a method for viewing different positions of an image simultaneously with the use's right and left eyes intersecting with each other at a nearby point (the intersection eye method), the three-dimensional sense of the image is reversed to that obtained in the parallel eye method. That is, those portions of the image which appears to be relieved and sunken against the background appear to be sunken and relieved, respectively, against the background. Thus, in order to perform conversion of a flat image to a three-dimensional image to view a stereogram, using the intersecting eye method, calculation of the distance between the first and second dots at step Z5 of FIG. 36 is performed, for example, as follows:

The distance (the number of dots) =the basic width+a degree of three dimensions×a coefficient depending on the degree of three dimensions.

What is claimed is:

1. A three-dimensional image creation device, comprising:

input means for inputting to said creation device first and second data, the first data including a series of different characters disposed in a predetermined order and the second data including at least one of character data and figure data;

first data storage means for storing the first data inputted by said input means;

bit map pattern storage means for storing the second data inputted by said input means, in the form of a bit map pattern, the bit map pattern including bit data arranged in a matrix arrangement, each bit data taking one of a first value and a second value;

read means for sequentially reading bit data of the bit map pattern of the second data stored in said bit map pattern storage means;

a three-dimensional image data memory used for storing three-dimensional image data therein;

three-dimensional image creating means including first means for sequentially reading out the first data from said first data storage means, and second means for sequentially and repeatedly disposing the series of different characters of the read first data on said three-dimensional image data memory, such that the different characters included in the read out first data are disposed in a matrix arrangement corresponding to the matrix arrangement of the second data stored in said bit map pattern storage means;

judging means for judging whether bit data of the second data read by said read means has taken a different value from the last read bit data;

control means for:

controlling the second means of said three-dimensional image creating means to thin out at least one character from the series of different characters of the first data to be disposed on said three-dimensional image data memory, when said judging means determines that bit data of the second data read by said read means has taken the second value while the last read bit data took the first value; and controlling said second means to insert the thinned out character into the original series of different characters of the first data to be disposed on said three-dimensional image data memory, when said judging means determines that data of the second data read by said read means has taken the first value while the last read bit data took the second value, whereby three-dimensional image data of the second data stored in said bit map pattern storage means, which is visible, is created and stored in said three-dimensional data memory by said three-dimensional data creating means; and printing means for printing on a printing medium the three-dimensional image data created in said three-dimensional image creating means, under control of said control means.

2. A three-dimensional image creation device, comprising:

input means for inputting to said creation device first and second data, the first data including a series of different characters disposed in a predetermined order and the second data including at least one of character data and figure data;

first data storage means for storing the first data inputted by said input means;

bit map pattern storage means for storing the second data inputted by said input means, in the form of a bit map pattern, the bit map pattern including bit data arranged in a matrix arranged, each bit data taking one of a first value and a second value;

read means for sequentially reading bit data of the bit map pattern of the second data stored in said bit map pattern storage means;

a three-dimensional image data memory used for storing three-dimensional image data therein;

three-dimensional image creating means including first means for sequentially reading out the first data from said first data storage means, and second means for sequentially and repeatedly disposing the series of different characters of the read first data on said three-dimensional image data memory, such that the different characters included in the read out first data are disposed in a matrix arrangement corresponding to the matrix arrangement of the second data stored in said bit map pattern storage means;

judging means for judging whether bit data of the second data read by said read means has taken a different value from a last read bit data;

control means for:

controlling the second means of said three-dimensional image creating means to thin out the character pointed by said pointer from the series of different characters of the first data to be disposed on said three-dimensional image data memory, when said judging means determines that bit data of the second data read by said read means has taken the second value while the last read bit data took the first value; and controlling said second means to insert the thinned out character into the original series of different characters of the first data to be disposed on said three-dimensional image data memory when said judging means determines that bit data of the second data read by said read means has taken the first value while the last read bit data took the second value, whereby three-dimensional image data of the second data stored in said bit map pattern storage means, which is visible, is created and stored in said three-dimensional data memory by said three-dimensional data creating means; and printing means for printing on a printing medium the three-dimensional image data created in said three-dimensional image data memory by said three-dimensional image creating means, under control of said control means.

3. A three-dimensional image creation device comprising:

input means for inputting first and second data, the first data including a series of different characters and the second data including character data and figure data;

first data storage means for storing the first data inputted by said input means;

bit map pattern storage means for storing the second data inputted by said input means in a bit map pattern, the bit map pattern including bit data disposed in a matrix arrangement, the bit data corresponding to the second data expressed in the bit map pattern each taking a first value and the bit data corresponding to background in the bit map pattern each taking a second value;

read means for sequentially reading the first data stored in said first data storage means;

three-dimensional image data memory for storing three-dimensional image data thereon;

three-dimensional image creating means for successively and repeatedly disposing the different characters of the first data read by said read means at a first cycle in a first area on a bit map pattern to be created on said three-dimensional image data memory, the first area corresponding to an area on the bit map pattern stored in said bit map pattern storage means, on which area the bit data of first values are disposed, and for disposing the different characters of the first data read by said read means at a second cycle different from the first cycle in a second area on the bit map pattern to be created on said three-dimensional image data memory, the second area corresponding to an area on the bit map pattern stored in said bit map pattern storage means, on which area the bit data of second values are disposed, whereby three-dimensional image data of the second data stored in said bit map pattern storage means is created on said three-dimensional image data memory; and printing means for printing the three-dimensional image data created on said image data memory by said three-dimensional image creating means on a printing medium.

4. A three-dimensional image creating device with a memory in which a password is stored, said device comprising:

input means for inputting personal data including at least one of name data, a phone number, a password and instructions;

part pattern storage means for storing plural pattern data for each of plural face parts which compose a face;

part pattern selecting means for selecting one part pattern data from among the plural part pattern data for each of the plural face parts composing a face stored in said part pattern storage means;

personal data storage means for storing plural personal data for plural persons, each including name data and a phone number, inputted through said input means, plural confidentiality data corresponding respectively to the plural personal data, and plural sets of part pattern data for the respective face parts selected by said part pattern selecting means, the plural sets of part pattern data corresponding respectively to the plural persons and each set of part pattern data being used to compose a face image, the confidentiality data to be attached to personal data which should be kept in confidence;

face image composing means for combining one set of part pattern data for one person stored in said personal data storage means to compose a face image of the person;

three-dimensional face image creating means for creating a three-dimensional face image based on the face image composed by said face image composing means, which three-dimensional face image data is three-dimensionally visible;

designating means for designating one of the personal data stored in said personal data storage means;

judging means for judging whether the confidentiality data is attached to the personal data designated by said designating means to keep said personal data in confidence;

display means for displaying data;

first control means for:
when said judging means determines that confidentiality data is attached to the personal data designated by said designating means, controlling:
said face image composing means to combine a set of part pattern data corresponding to the personal data designated by said designating means to compose a corresponding face image,
said three-dimensional face image creating means to create a three-dimensional face image data based on the corresponding face image composed by said face image composing means, and
said display means to display the three-dimensional face image created by said three-dimensional face image creating means, and
when said judging means determines that confidentiality data is not attached to the personal data designated by said designating means, controlling:
said face image composing means to combine the set of part pattern data corresponding to the personal data designated by said designating means to compose the face image corresponding to the personal data designated by said designating means, and
said display means to display the face image composed by said face image composing means together with the personal data designated by said designating means;

comparing means for comparing a password inputted by said input means with the password stored in the memory; and second control means for, when said comparing means determines that a password coincides with the password stored in the memory, which password is inputted by said input means while the three-dimensional face image is displayed on said display means, controlling said display to display, in place of the three-dimensional face image displayed thereon, the face image composed by said face image composing means together with the personal data designated by said designating means.

5. A three-dimensional image creating device according to claim 4, wherein said device is portable.

* * * * *

UNITED STATES PATENT AND TRADEMARK OFFICE
CERTIFICATE OF CORRECTION

PATENT NO.   : 5,636,334
DATED        : 3 June 1997
INVENTOR(S)  : HIDAKA

It is certified that error appears in the above-identified patent and that said Letters Patent is hereby corrected as shown below:

In Column 30, line 27 (claim 2, line 13)

change "arranged" to --arrangement--.

Signed and Sealed this

Third Day of February, 1998

Attest:

BRUCE LEHMAN

Attesting Officer      Commissioner of Patents and Trademarks